(12) United States Patent
Huang et al.

(10) Patent No.: US 12,738,988 B2
(45) Date of Patent: Sep. 15, 2026

(54) CHANNEL ESTIMATION BASED BEAM DETERMINATION IN HOLOGRAPHIC MULTIPLE-IN MULTIPLE-OUT SYSTEM

(71) Applicant: QUALCOMM Incorporated, San Diego, CA (US)

(72) Inventors: Min Huang, Beijing (CN); Chao Wei, Beijing (CN); Wei Xi, Beijing (CN); Hao Xu, Beijing (CN); Sony Akkarakaran, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 214 days.

(21) Appl. No.: 18/560,864

(22) PCT Filed: Jul. 5, 2021

(86) PCT No.: PCT/CN2021/104434
§ 371 (c)(1),
(2) Date: Nov. 14, 2023

(87) PCT Pub. No.: WO2023/279226
PCT Pub. Date: Jan. 12, 2023

(65) Prior Publication Data

US 2024/0405811 A1 Dec. 5, 2024

(51) Int. Cl.
*H04B 7/0417* (2017.01)
*H04B 7/06* (2006.01)
(Continued)

(52) U.S. Cl.
CPC ......... *H04B 7/0417* (2013.01); *H04L 5/0023* (2013.01); *H04L 5/0053* (2013.01); *H04L 25/0242* (2013.01); *H04B 7/0626* (2013.01)

(58) Field of Classification Search
CPC .. H04B 7/0417; H04B 7/0626; H04B 7/0691; H04B 7/0874; H04B 7/088;
(Continued)

(56) References Cited

U.S. PATENT DOCUMENTS 11,638,281 B2 * 4/2023 Mo .................. H04W 52/0261
370/329
12,156,058 B2 * 11/2024 Laselva ................ H04W 24/08
(Continued)

OTHER PUBLICATIONS

International Search Report and Written Opinion—PCT/CN2021/104434—ISA/EPO—Mar. 3, 2022.
(Continued)

*Primary Examiner* — Mahendra R Patel
(74) *Attorney, Agent, or Firm* — Holland & Hart LLP /Qualcomm

(57) ABSTRACT

Methods, systems, and devices for wireless communications are described. A user equipment (UE) may receive, from a base station, a first indication that the UE is within a distance threshold (e.g., in the near field) of multiple-in multiple-out (MIMO) communications from the base station. The UE may communicate with the base station via signaling including a second indication of antenna panel information of at least one of the UE or the base station, the communication based on the UE being within the distance threshold. The UE may receive, from the base station, a first beamformed signal on one or more first beams within the distance threshold, and the UE may receive, from the base station, one or more second beamformed signals on a second beam within the distance threshold, the second beam based on a channel response matrix that is estimated from the second indication and the first beamformed signal.

30 Claims, 17 Drawing Sheets

(51) Int. Cl.
*H04L 5/00* (2006.01)
*H04L 25/02* (2006.01)

(58) Field of Classification Search
CPC .............. H04B 7/06952; H04B 7/0408; H04B 7/0413; H04B 7/0617; H04L 5/0023; H04L 5/0053; H04L 25/0242; H04L 5/0014; H04L 25/0202
USPC .......................................................... 370/329
See application file for complete search history.

(56) References Cited

U.S. PATENT DOCUMENTS 12,457,025 B2 * 10/2025 Huang ............... H04B 7/06952
12,489,492 B2 * 12/2025 Dai ...................... H04B 7/0447
2019/0288760 A1 * 9/2019 Li ........................ H04B 7/0632
2021/0083728 A1 * 3/2021 Cheraghi ........... H04B 7/06952
2021/0136598 A1 * 5/2021 Raghavan ............ H04B 7/0691
2024/0405811 A1 * 12/2024 Huang ................... H04B 7/088
2025/0062841 A1 * 2/2025 Patchava .............. H04B 7/0617

OTHER PUBLICATIONS

Partial International Search Report—PCT/CN2021/104434—ISA/EPO—Jan. 10, 2022.

3GPP: "3rd Generation Partnership Project; Technical Specification Group Radio Access Network; NR; Physical Layer Procedures for Data (Release 16)", 3GPP Standard, Technical Specification, 3GPP TS 38.214, 3rd Generation Partnership Project (3GPP), Mobile Competence Centre, 650 Route Des Lucioles, F-06921 Sophia-Antipolis Cedex, France, vol. RAN WG1, No. 3GPP TS 38.214, V16.6.0, (Jun. 2021), Jun. 2021, 171 Pages, XP052029956.

* cited by examiner

600

800

CHANNEL ESTIMATION BASED BEAM DETERMINATION IN HOLOGRAPHIC MULTIPLE-IN MULTIPLE-OUT SYSTEM

CROSS REFERENCE

The present application is a 371 national stage filing of International PCT Application No. PCT/CN2021/104434 by HUANG et al. entitled "CHANNEL ESTIMATION BASED BEAM DETERMINATION IN HOLOGRAPHIC MULTIPLE-IN MULTIPLE-OUT SYSTEM," filed Jul. 5, 2021, which is assigned to the assignee hereof, and which is expressly incorporated by reference in its entirety herein.

FIELD OF TECHNOLOGY

The following relates to wireless communications, including channel estimation based beam determination in holographic multiple-in multiple-out (MIMO) systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, devices may be configured to communicate using beamforming techniques. However, beamforming techniques for devices in the near field could be improved.

SUMMARY

The described techniques relate to improved methods, systems, devices, and apparatuses that support channel estimation based beam determination in holographic multiple-in multiple-out (MIMO) systems. Generally, the described techniques provide for a user equipment (UE) and a base station to perform a channel estimation-based beam determination scheme in a holographic MIMO system. In some cases, the base station may indicate the field type (e.g., near field or far field) of MIMO communications from the base station to the UE. In some cases, if the UE is in the near field, the base station may transmit a beamformed data signal (e.g., a reference signal) to the UE and the base station may indicate a transmit panel information such as transmit antenna panel length and a number of transmit antennas, among other information, to the UE. The UE may use the beamformed data signal and the transmit panel information to estimate a channel response matrix and determine transmit beamforming weights. Additionally or alternatively, the UE may indicate receive panel information such as a receive antenna panel length and a number of receive antennas, among other information, to the base station, which the base station may use to estimate the channel response matrix and determine receive beamforming weights. Using the channel response matrix, the UE and the base station may communicate using holographic MIMO techniques.

A method for wireless communication at a UE is described. The method may include receiving, from a base station, a first indication that the UE is within a distance threshold of MIMO communications from the base station, communicating with the base station via signaling that includes a second indication of antenna panel information of at least one of the UE or the base station, the signaling transmitted by the UE or received at the UE based on the UE being within the distance threshold of the MIMO communications from the base station, receiving, from the base station, a first beamformed signal on one or more first beams within the distance threshold of the MIMO communications, and receiving, from the base station, one or more second beamformed signals on a second beam within the distance threshold of the MIMO communications, where the second beam is based on a channel response matrix that is estimated from at least the second indication and the first beamformed signal.

An apparatus for wireless communication at a UE is described. The apparatus may include a processor, memory coupled with the processor, and instructions stored in the memory. The instructions may be executable by the processor to cause the apparatus to receive, from a base station, a first indication that the UE is within a distance threshold of MIMO communications from the base station, communicate with the base station via signaling that includes a second indication of antenna panel information of at least one of the UE or the base station, the signaling transmitted by the UE or received at the UE based on the UE being within the distance threshold of the MIMO communications from the base station, receive, from the base station, a first beamformed signal on one or more first beams within the distance threshold of the MIMO communications, and receive, from the base station, one or more second beamformed signals on a second beam within the distance threshold of the MIMO communications, where the second beam is based on a channel response matrix that is estimated from at least the second indication and the first beamformed signal.

Another apparatus for wireless communication at a UE is described. The apparatus may include means for receiving, from a base station, a first indication that the UE is within a distance threshold of MIMO communications from the base station, means for communicating with the base station via signaling that includes a second indication of antenna panel information of at least one of the UE or the base station, the signaling transmitted by the UE or received at the UE based on the UE being within the distance threshold of the MIMO communications from the base station, means for receiving, from the base station, a first beamformed signal on one or more first beams within the distance threshold of the MIMO communications, and means for receiving, from the base station, one or more second beamformed signals on a second beam within the distance threshold of the MIMO communications, where the second beam is based on a channel response matrix that is estimated from at least the second indication and the first beamformed signal.

A non-transitory computer-readable medium storing code for wireless communication at a UE is described. The code may include instructions executable by a processor to receive, from a base station, a first indication that the UE is within a distance threshold of MIMO communications from the base station, communicate with the base station via signaling that includes a second indication of antenna panel information of at least one of the UE or the base station, the signaling transmitted by the UE or received at the UE based on the UE being within the distance threshold of the MIMO communications from the base station, receive, from the base station, a first beamformed signal on one or more first beams within the distance threshold of the MIMO communications, and receive, from the base station, one or more second beamformed signals on a second beam within the distance threshold of the MIMO communications, where the second beam is based on a channel response matrix that is estimated from at least the second indication and the first beamformed signal.

In some examples of the method, apparatuses, and non-transitory computer-readable medium described herein, communicating with the base station via the signaling may include operations, features, means, or instructions for receiving the second indication of the antenna panel information from the base station, the antenna panel information being for one or more transmit panels of the base station.

Some examples of the method, apparatuses, and non-transitory computer-readable medium described herein may further include operations, features, means, or instructions for estimating the channel response matrix based on the antenna panel information from the base station and the first beamformed signal.

Some examples of the method, apparatuses, and non-transitory computer-readable medium described herein may further include operations, features, means, or instructions for determining the second beam based on the channel response matrix estimated from the antenna panel information from the base station and the first beamformed signal.

Some examples of the method, apparatuses, and non-transitory computer-readable medium described herein may further include operations, features, means, or instructions for transmitting, to the base station, a report indicating the channel response matrix estimated by the UE based on the antenna panel information from the base station and the first beamformed signal.

Some examples of the method, apparatuses, and non-transitory computer-readable medium described herein may further include operations, features, means, or instructions for transmitting, to the base station, a report indicating the second beam to be used for the one or more second beamformed signals, the second beam determined based on the channel response matrix estimated from the antenna panel information from the base station and the first beamformed signal.

In some examples of the method, apparatuses, and non-transitory computer-readable medium described herein, communicating with the base station via the signaling may include operations, features, means, or instructions for transmitting the second indication of the antenna panel information from the UE to the base station, the antenna panel information being for one or more receive panels of the UE.

In some examples of the method, apparatuses, and non-transitory computer-readable medium described herein, receiving the first indication that the UE may be within the distance threshold of the MIMO communications from the base station may include operations, features, means, or instructions for receiving the first indication in a system information message or via a unicast or multicast message.

Some examples of the method, apparatuses, and non-transitory computer-readable medium described herein may further include operations, features, means, or instructions for receiving the first indication that the UE may be within the distance threshold of MIMO communications from the base station may be an alternative to receiving notice that the UE may be outside of the distance threshold of the MIMO communications from the base station.

In some examples of the method, apparatuses, and non-transitory computer-readable medium described herein, receiving the first beamformed signal on the one or more first beams within the distance threshold of the MIMO communications may include operations, features, means, or instructions for receiving the first beamformed signal as a beamformed data signal or a reference signal.

In some examples of the method, apparatuses, and non-transitory computer-readable medium described herein, receiving the first beamformed signal on the one or more first beams within the distance threshold of the MIMO communications may include operations, features, means, or instructions for taking measurements of the first beamformed signal on the one or more first beams, where a number of beams on which the measurements may be taken may be greater than a number of reflectors between the UE and the base station, and where the one or more first beams may be beams directed towards the UE, randomly-directed beams, or both.

In some examples of the method, apparatuses, and non-transitory computer-readable medium described herein, the antenna panel information may be for either one or more transmit panels of the base station or one or more receive panels of the UE, and where the antenna panel information includes a panel length, a number of antennas per panel, positions of the antennas per panel, or a combination thereof.

In some examples of the method, apparatuses, and non-transitory computer-readable medium described herein, communicating with the base station via the signaling may include operations, features, means, or instructions for communicating the second indication of the antenna panel information during a connection setup procedure between the base station and the UE or after a change in either a transmit panel of the base station or a receive panel of the UE.

In some examples of the method, apparatuses, and non-transitory computer-readable medium described herein, communicating with the base station via the signaling may include operations, features, means, or instructions for communicating, with the antenna panel information, beamforming weight information indicative of beamforming weights used either by the base station to transmit the first beamformed signal or by the UE to receive the first beamformed signal.

In some examples of the method, apparatuses, and non-transitory computer-readable medium described herein, the beamforming weight information includes one or more indices of codewords that represent the beamforming weights, and where each of the beamforming weights may be associated with one of the one or more first beams.

A method for wireless communication at a base station is described. The method may include transmitting, to a UE, a first indication that the UE is within a distance threshold of MIMO communications from the base station, communicating with the UE via signaling that includes a second indication of antenna panel information of at least one of the UE or the base station, the signaling transmitted by the UE or received at the UE based on the UE being within the distance threshold of the MIMO communications from the base station, transmitting, to the UE, a first beamformed signal on one or more first beams within the distance threshold of the MIMO communications, and transmitting, to the UE, one or more second beamformed signals on a second beam within the distance threshold of the MIMO communications, where the second beam is based on a channel response matrix that is estimated from at least the second indication and the first beamformed signal.

An apparatus for wireless communication at a base station is described. The apparatus may include a processor, memory coupled with the processor, and instructions stored in the memory. The instructions may be executable by the processor to cause the apparatus to transmit, to a UE, a first indication that the UE is within a distance threshold of MIMO communications from the base station, communicate with the UE via signaling that includes a second indication of antenna panel information of at least one of the UE or the base station, the signaling transmitted by the UE or received at the UE based on the UE being within the distance threshold of the MIMO communications from the base station, transmit, to the UE, a first beamformed signal on one or more first beams within the distance threshold of the MIMO communications, and transmit, to the UE, one or more second beamformed signals on a second beam within the distance threshold of the MIMO communications, where the second beam is based on a channel response matrix that is estimated from at least the second indication and the first beamformed signal.

Another apparatus for wireless communication at a base station is described. The apparatus may include means for transmitting, to a UE, a first indication that the UE is within a distance threshold of MIMO communications from the base station, means for communicating with the UE via signaling that includes a second indication of antenna panel information of at least one of the UE or the base station, the signaling transmitted by the UE or received at the UE based on the UE being within the distance threshold of the MIMO communications from the base station, means for transmitting, to the UE, a first beamformed signal on one or more first beams within the distance threshold of the MIMO communications, and means for transmitting, to the UE, one or more second beamformed signals on a second beam within the distance threshold of the MIMO communications, where the second beam is based on a channel response matrix that is estimated from at least the second indication and the first beamformed signal.

A non-transitory computer-readable medium storing code for wireless communication at a base station is described. The code may include instructions executable by a processor to transmit, to a UE, a first indication that the UE is within a distance threshold of MIMO communications from the base station, communicate with the UE via signaling that includes a second indication of antenna panel information of at least one of the UE or the base station, the signaling transmitted by the UE or received at the UE based on the UE being within the distance threshold of the MIMO communications from the base station, transmit, to the UE, a first beamformed signal on one or more first beams within the distance threshold of the MIMO communications, and transmit, to the UE, one or more second beamformed signals on a second beam within the distance threshold of the MIMO communications, where the second beam is based on a channel response matrix that is estimated from at least the second indication and the first beamformed signal.

In some examples of the method, apparatuses, and non-transitory computer-readable medium described herein, communicating with the UE via the signaling may include operations, features, means, or instructions for receiving the second indication of the antenna panel information from the UE, the antenna panel information being for one or more receive panels of the UE.

Some examples of the method, apparatuses, and non-transitory computer-readable medium described herein may further include operations, features, means, or instructions for estimating the channel response matrix based on the antenna panel information from the UE and the first beamformed signal.

Some examples of the method, apparatuses, and non-transitory computer-readable medium described herein may further include operations, features, means, or instructions for determining the second beam based on the channel response matrix estimated from the antenna panel information from the UE and the first beamformed signal.

Some examples of the method, apparatuses, and non-transitory computer-readable medium described herein may further include operations, features, means, or instructions for receiving, from the UE, a report indicating the channel response matrix estimated by the UE based on the antenna panel information from the base station and the first beamformed signal.

Some examples of the method, apparatuses, and non-transitory computer-readable medium described herein may further include operations, features, means, or instructions for receiving, from the UE, a report indicating the second beam to be used for the one or more second beamformed signals, the second beam determined based on the channel response matrix estimated from the antenna panel information from the base station and the first beamformed signal.

In some examples of the method, apparatuses, and non-transitory computer-readable medium described herein, communicating with the base station via the signaling may include operations, features, means, or instructions for transmitting the second indication of the antenna panel information from the base station to the UE, the antenna panel information being for one or more transmit panels of the base station.

In some examples of the method, apparatuses, and non-transitory computer-readable medium described herein, transmitting the first indication that the UE may be within the distance threshold of the MIMO communications from the base station may include operations, features, means, or instructions for transmitting the first indication in a system information message or via a unicast or multicast message.

Some examples of the method, apparatuses, and non-transitory computer-readable medium described herein may further include operations, features, means, or instructions for transmitting the first indication that the UE may be within the distance threshold of MIMO communications from the base station may be an alternative to transmitting notice that the UE may be outside of the distance threshold of the MIMO communications from the base station.

In some examples of the method, apparatuses, and non-transitory computer-readable medium described herein, transmitting the first beamformed signal on the one or more first beams within the distance threshold of the MIMO communications may include operations, features, means, or instructions for transmitting the first beamformed signal as a beamformed data signal or a reference signal.

In some examples of the method, apparatuses, and non-transitory computer-readable medium described herein, the antenna panel information may be for either one or more transmit panels of the base station or one or more receive panels of the UE, and where the antenna panel information includes a panel length, a number of antennas per panel, positions of the antennas per panel, or a combination thereof.

In some examples of the method, apparatuses, and non-transitory computer-readable medium described herein, communicating with the UE via the signaling may include operations, features, means, or instructions for communicating the second indication of the antenna panel information during a connection setup procedure between the base station and the UE or after a change in either a transmit panel of the base station or a receive panel of the UE.

In some examples of the method, apparatuses, and non-transitory computer-readable medium described herein, communicating with the UE via the signaling may include operations, features, means, or instructions for communicating, with the antenna panel information, beamforming weight information indicative of beamforming weights used either by the base station to transmit the first beamformed signal or by the UE to receive the first beamformed signal.

DETAILED DESCRIPTION

Figure 1:
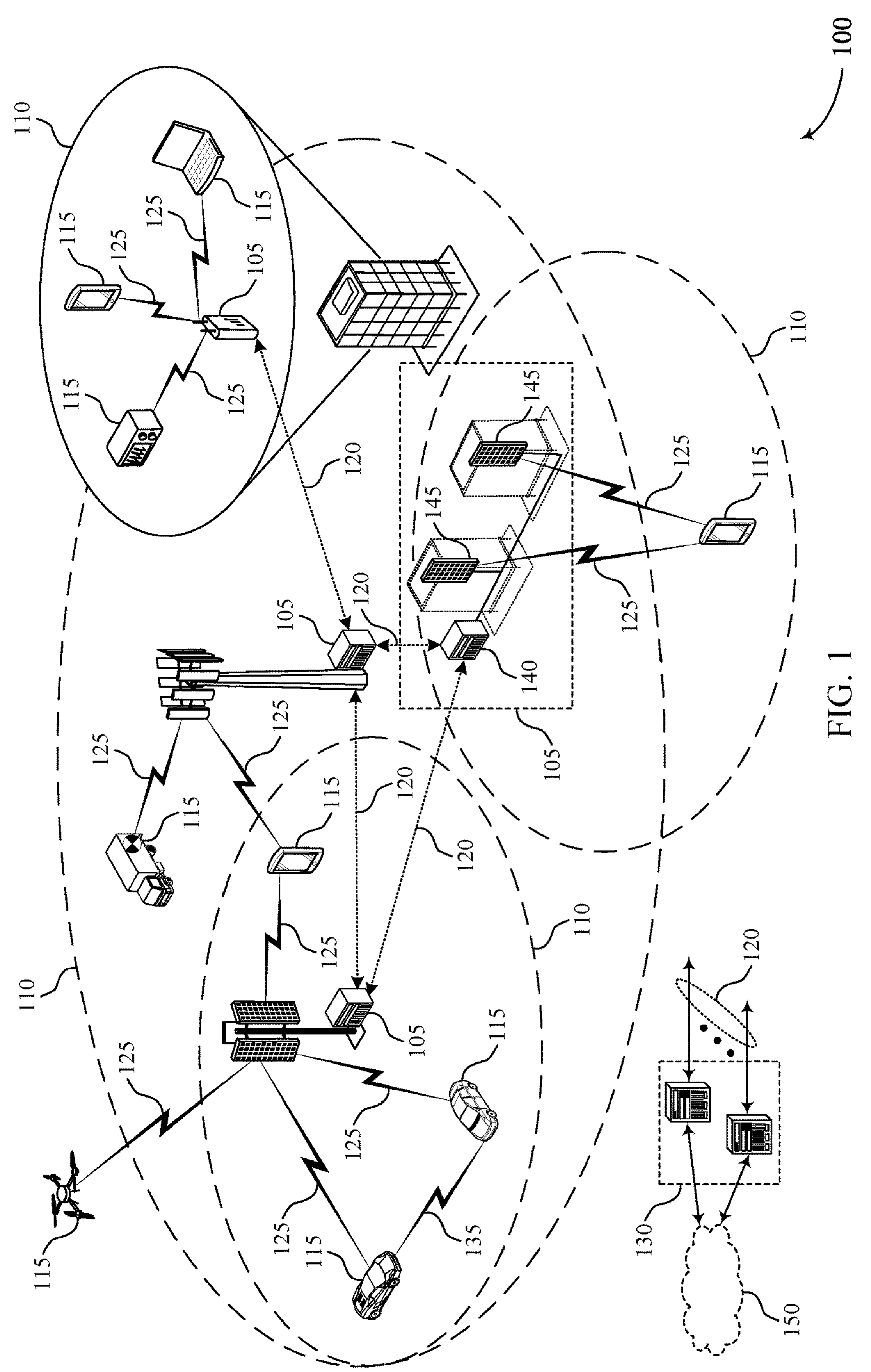
FIG. 1 illustrates an example of a wireless communications system that supports channel estimation based beam determination in holographic multiple-in multiple-out (MIMO) systems in accordance with aspects of the present disclosure.

In some wireless communications systems (e.g., fifth generation (5G), New Radio (NR) systems), devices may be configured to communicate using beamforming techniques. For example, a base station may focus a transmission beam in the direction of a user equipment (UE) using two dimensional (2D) beamforming techniques. In some cases, the UE and the base station may perform multi-user (MU) multiple-in multiple-out (MIMO) communications to transmit or receive multiple signals via different spatial layers. The multiple signals may be transmitted or received via different antennas or different combinations of antennas. For example, the base station may maintain communications with a first UE via a first beam and communications via with a second UE via a second beam that is different than the first beam.

Some wireless communications systems may be configured to use beamforming techniques which may support both direction and distance discrimination in MU-MIMO scenarios. For example, the base station may be configured to perform three dimensional (3D) beamforming techniques, where the base station may form transmission beams using different antenna panels to UEs that may distinguish both direction and distance between the UEs and the base station. In some cases, the base station may be configured to perform 3D holographic MIMO in which the base station may multiplex UEs otherwise unsupported for multiplexing (e.g., if the base station were to use 2D beamforming techniques). Depending on the length of a transmit antenna panel at the base station, a 3D beam may have different effectiveness to UEs in the near field (e.g., within a distance threshold of MIMO communications from the base station) and UEs in the far field (e.g., outside of a distance threshold of MIMO communications from the base station). In the near field, for example, 3D beamforming may create small beam concentration areas, increasing the number of beams the base station may use and therefore, increasing latency and signaling overhead. To generate an optimal transmit beam at the base station or receive beam at the UE for 3D beamforming, the base station or the UE may use a channel response matrix. However, as signals may depart from each transmit antenna and arrive at each receive antenna at different angles, techniques for generating the channel response matrix may be deficient. As such, the transmit and receive antenna panel lengths greatly impact channel response matrix values.

Techniques described herein enable the UE and the base station to perform a channel estimation-based beam determination scheme in a holographic MIMO system. In some cases, the base station may indicate the field type (e.g., near field or far field) of communications to the UE. In some cases, if the UE is in the near field, the base station may transmit a beamformed data signal (e.g., a reference signal) to the UE and the base station may indicate transmit panel information such as a transmit antenna panel length and a number of transmit antennas, among other information, to the UE. The UE may use the beamformed data signal and the transmit panel information to estimate a channel response matrix and determine transmit beamforming weights. Additionally or alternatively, the UE may indicate receive panel information such as a receive antenna panel length and a number of receive antennas, among other information, to the base station, which the base station may use to estimate the channel response matrix and determine receive beamforming weights. Using the channel response matrix, the UE and the base station may communicate using holographic MIMO techniques.

Particular aspects of the subject matter described herein may be implemented to realize one or more advantages. The described techniques may support improvements in performing a channel estimation-based beam determination scheme in a holographic MIMO by reducing signaling overhead. Further, in some examples, holographic MIMO techniques as described herein may improve beamforming gain and reduce determination latency for UEs in the near field. As such, supported techniques may include improved network operations, and, in some examples, may promote network efficiencies, among other benefits.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to channel estimation based beam determination in holographic MIMO systems.

FIG. 1 illustrates an example of a wireless communications system 100 that supports channel estimation based beam determination in MIMO systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 and a UE 115 may perform a channel estimation-based beam determination scheme in a holographic MIMO system. The base station 105 may indicate a field type (e.g., near field or far field) to the UE 115. In some cases, if the UE is in the neat field, the base station 105 may transmit a beamformed data signal (e.g., a reference signal) to the UE 115 and may indicate transmit panel information such as a transmit antenna panel length and a number of transmit antennas, among other information, to the UE 115. The UE 115 may use the beamformed data signal and the transmit panel information to estimate a channel response matrix and determine transmit beamforming weights. Additionally or alternatively, the UE 115 may indicate receive panel information such as a receive antenna panel length and a number of receive antennas, among other information, to the base station 105, which the base station 105 may use to estimate the channel response matrix and determine receive beamforming weights. Using the channel response matrix, the UE 115 and the base station 105 may communicate using holographic MIMO techniques.

Figure 2:
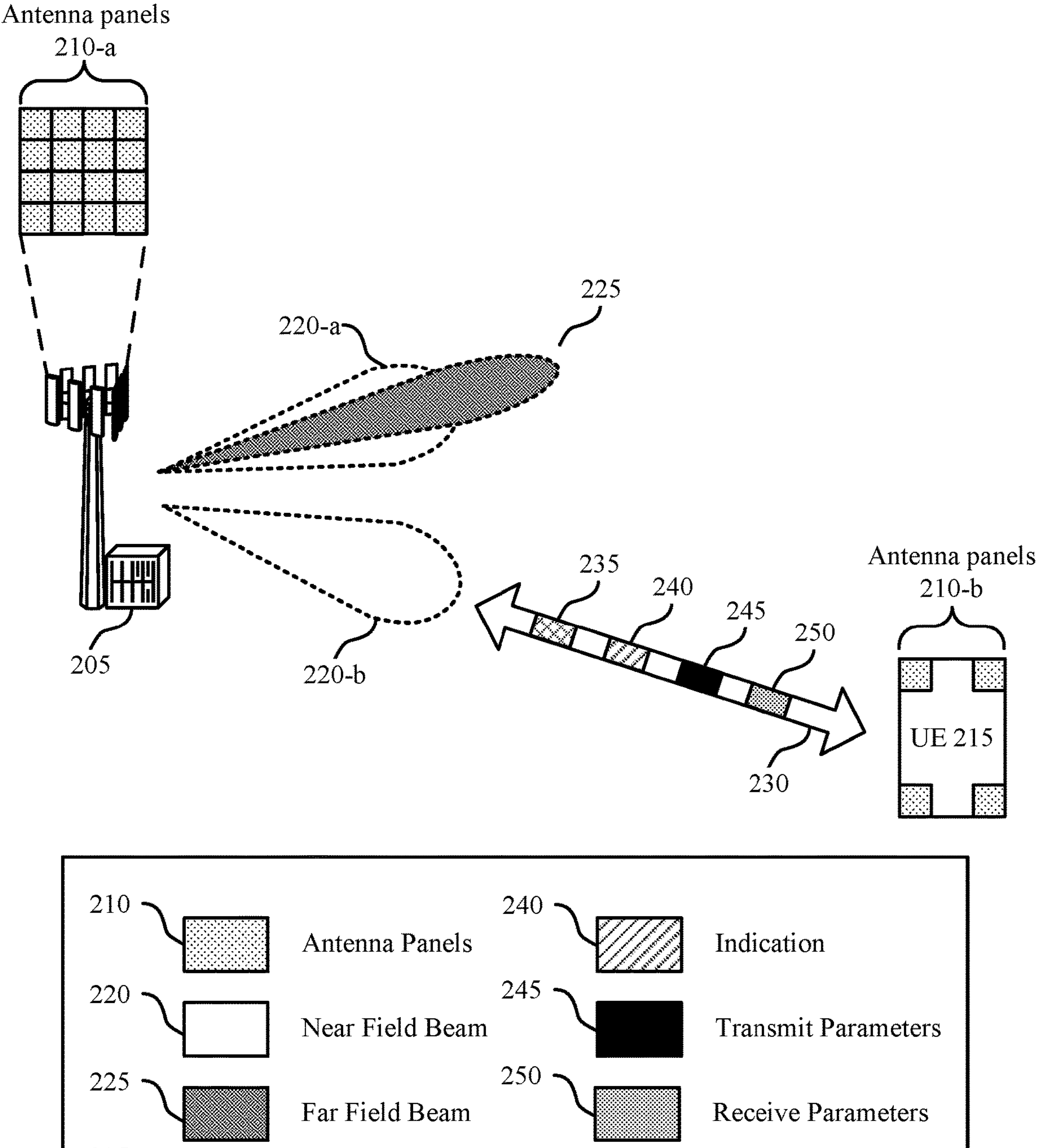
FIG. 2 illustrates an example of a wireless communications system that supports channel estimation based beam determination in holographic MIMO systems in accordance with aspects of the present disclosure.

FIG. 2 illustrates an example of a wireless communications system 200 that supports channel estimation based beam determination in holographic MIMO systems in accordance with aspects of the present disclosure. In some examples, the wireless communications system 200 may implement aspects of the wireless communications system 100 or may be implemented by aspects of the wireless communications system 100. For example, the wireless communications system 200 may include a UE 215 and a base station 205, which may be examples of corresponding devices described herein with reference to FIG. 1. The wireless communications system 200 may include features for improved communications between the UE 215 and the base station 205, among other benefits.

The base station 205 and the UE 215 may be configured to transmit and receive signaling using one or more antenna panels 210. For example, the base station 205 may use the antenna panels 210-*a* to transmit signaling to the UE 215, and the UE 215 may receive the signaling using the antenna panels 210-*b*. In some cases, transmitting signaling using a specific configuration of antenna panels 210 may result in regions of constructive interference and regions of destructive interference while forming a transmission beam.

In some cases, the base station 205 may be configured to use 2D beamforming techniques using an antenna array, which may include the antenna panels 210-*a*. 2D beamforming may concentrate transmission power to a direction described by angles in azimuth and zenith (e.g., azimuth angles of departure (AoD)/azimuth angles of arrival (AoA), zenith angles of departure (ZoD)/zenith angles of arrival (ZoA)). In some cases, 2D beamforming may create a low MU-MIMO opportunity, may lack the ability to discriminate UEs 215 located in the same direction and different distances, and thus may lack the ability to pair the UEs 215 for MU-MIMO transmission. This may result in restricted MU pairing opportunities and MU diversity gain and reduced cell-level spectral efficiency. In some cases, 2D beamforming may also lead to low transmission power utilization efficiency. A 2D beam may cover the whole area of some angle, but a target UE (e.g., the UE 215) may be located at one spot area with a particular distance from the base station 205. Thus, the transmission power landing at the areas with other distances may be wasted.

The wireless communications system 200 may be configured to use beamforming techniques which may support both direction and distance discrimination in MU-MIMO scenarios. In some cases, the base station 205 may be configured to perform 3D holographic MIMO, in which the base station 205 may multiplex UEs (e.g., the UE 215) otherwise unsupported for multiplexing (e.g., if the base station 205 were to use 2D beamforming techniques). The base station 205 may perform holographic MIMO (e.g., holographic massive MIMO) with an active surface located at the base station 205 which may generate a radio frequency (RF) signal at the backside of the surface, and where the RF signal may propagate through a steerable distribution network to radiating elements that may generate a beam, such as a near field beam 220 (e.g., a near field beam 220-*a*, a near field beam 220-*b*), or a far field beam 225. In some examples, holographic MIMO may be performed with a passive surface located at a different location than the base station 205, where the RF signal may be sent from another location and a metasurface may reflect the RF signal using steerable elements that may generate the beam.

In some cases in which the base station 205 may perform 3D holographic MIMO, the coverage area close to the antenna panel 210-*a* of the base station 205 may be called the near field (e.g., supported by the near field beams 220), while the coverage area far away from the antenna panel 210-*a* of the base station 205 may be called the far field (e.g., supported by the far field beam 225). Differences between the near field and far field are explained in greater detail with respect to FIG. 3. When the distance of a coverage area is sufficiently short (e.g., relative to the length of the antenna panels 210), the generated beam to this area may have holographic characteristics. For example, the near field beams 220 may have holographic characteristics if the near field is relatively close to the antenna panels 210-*a*. In some cases, the beam may be capable of distinguishing direction and distance, and as such the beam may be a 3D beam or a holographic beam. The 3D beam may cover an angular range and a distance range. When the base station 205 utilizes one or more 3D beams to transmit one or multiple data streams, the base station 205 is using a holographic MIMO system. 3D beamforming may create a high MU-MIMO opportunity, may discriminate UEs 215 with the same direction and different distances, and may pair the UEs 215 for MU-MIMO transmission (e.g., as opposed to 2D beamforming, which may lack the ability to discriminate between UEs 215 with the same direction and difference distances). The high MU-MIMO opportunity may result in enhanced MU pairing opportunities and MU diversity gain, as well as improved cell-level spectral efficiency. In some cases, 3D beamforming may also introduce high transmission power utilization efficiency. The 3D beam may cover the area of the target UE (e.g., the UE 215) in terms of both direction and distance, thus, the transmission power landing at the areas with other angles or distances may be minimized, so the transmission power utilization efficiency may be improved.

The process of determining which beam to use for transmissions may differ based on whether the UE 215 is in the near field or the far field. For example, in the near field, the base station 205 may communicate with the UE 215 via a communications link 230 using the near field beam 220-*b*. In the near field area, using 3D beamforming may cause the beam concentration area of the near field beam 220-*b* to become very small, thus the number of near field beams 220 the base station 205 uses may become very large. In this way, to accurately direct the near field beam 220-*b* to the target UE (e.g., the UE 215), the latency of beam sweeping may become long. Instead, to generate the optimal transmit beam, the optimal receive beam, or both, the base station 205 or the UE 215 may retrieve a channel response matrix based on one or more measurement signals. The base station 205 or the UE 215 may then use its major singular vector as a transmit precoding vector or a receive combining vector. Such retrieving may be based on measurements on precoded signals (e.g., using compressive sensing (CS) or artificial intelligence (AI) algorithms). In some cases, the latency of these measurements may be shorter than for beam sweeping.

Additionally or alternatively, the process of retrieving the channel response matrix may differ based on whether the UE 215 is in the near field or the far field. For example, when the UE 215 is located in the far field area of the base station 205, signal departure angles may be identical to each transmit antenna in the antenna panel 210-*a*, and signal arrival angles may be identical to each receive antenna in the antenna panel 210-*b*. Thus, the transmit and receive panel lengths may refrain from impacting the channel response matrix construction. When the UE 215 is located in the near field area of the base station 205, signal departure angles may be different for each transmit antenna of the antenna panel 210-*a*, and signal arrival angles may be different for each receive antenna of the antenna panel 210-*b*. Thus, the transmit and receive panel lengths may greatly impact the channel response matrix values, and without panel length information, the UE 215 or the base station 205 may lack the ability to retrieve the channel matrix.

To perform channel estimation-based beam determination in the near field, the base station 205 may transmit a beamformed data signal 235 or a reference signal (e.g., a CSI-RS) to the UE 215. To transmit the beamformed data signal 235, the base station 205 may use beams directed toward the UE 215, random beams, or both. The number of beams the base station 205 may measure to retrieve the channel response matrix may be larger than the number of reflectors. As such, this scheme may fit into the environment as described in FIG. 2 with sparse reflectors. With high carrier frequency (e.g., 100 GHz, 100 THz), this condition (e.g., of few reflectors) may be mostly satisfied.

In addition to transmitting the beamformed data signal 235, the base station 205 may transmit an indication 240 (e.g., a signaling messaging 1) to the UE 215 via the communications link 230 (e.g., a control channel). The indication 240 may indicate the field type (e.g., near field or far field) to the UE 215. The base station 205, the UE 215, or both may transmit an indication of antenna panel information (e.g., a signaling message 2) to each other via the communications link 230. For example, to support the UE 215 performing near field channel response matrix retrieval and beam determination, the base station 205 may indicate transmit parameters 245 to the UE 215, including the transmit antenna panel information. The transmit antenna panel information may include a transmit panel length $d_{tx}$, a number of transmit antennas $N_{tx}$, antenna positions in the transmit antenna panel 210-*a*, and the like. The transmit parameters 245 may also include transmit beamforming weights $$\{w_{tx,k}\}_{k=1\sim N_{measure}},$$

where $N_{measure}$ represents the number of measurements. In some cases, after the UE 215 estimates the channel response matrix based on the beamformed data signal 235 and the transmit parameters 245, the UE 215 may transmit a report to the base station 205 to indicate the retrieved channel response matrix or the determined transmit beam weights. The transmit parameters 245 may be transmitted upon connection setup or upon a transmit antenna panel or a receive antenna panel changing. In some cases, the transmit and receive beamforming weights may come from given codebooks, in which case the transmit parameters 245 may be the indices of codewords that may have been used. Each of the indicated beamforming weights may be associated with one measurement result (e.g., a beamforming weight may be associated with a port of a reference signal resource).

In some examples, to support the base station 205 performing near field channel response matrix retrieval and beam determination, the UE 215 may indicate receive parameters 250 to the base station 205, including receive antenna panel information. The receive antenna panel information may include a receive panel length $d_{rx}$, a number of receive antennas $N_{rx}$, antenna positions in the receive antenna panel 210-*b*, and the like. The receive parameters 250 may also include receive beamforming weights $$\{w_{rx,k}\}_{k=1\sim N_{measure}}$$

and the received signals $$\{y_k\}_{k=1\sim N_{measure}}.$$

The receive parameters 250 may be transmitted upon connection setup or upon a transmit antenna panel or a receive antenna panel changing. In some cases, the beamformed data signal 235 and the transmit parameters 245 or the receive parameters 250 may be transmitted together or separately.

In some examples, if the base station 205 covers a near field area or a far field area, the base station 205 may transmit the indication 240 of the field type in system information. If the base station 205 covers both the near field area and the far field area, the base station 205 may transmit the indication 240 unicast to each UE 215 or multicast (e.g., group cast) to a group of UEs 215. The base station 205 may determine whether a particular UE 215 lies in the near field or the far field based on the position estimation of the UE 215. If the indicated field type is far field, the UE 215 may participate in beam sweeping-based beam determination with the base station 205. The UE 215 may measure a number of beamformed synchronization signal blocks (SSBs) or CSI-RSs and may report the identifier (ID) of the selected beam with the highest signal strength. If the indicated field type is near field, the UE 215 may perform channel estimation-based beam determination as described herein, based on the information provided in the indication 240 (e.g., the signaling message 2).

In some cases, the base station 205, the UE 215, or both may estimate the channel response matrix based on the beamformed data signal 235 and the transmit parameters 245 or the receive parameters 250. After estimating the channel response matrix, the base station 205, the UE 215, or both may determine beamforming weights. The beamforming weights may be one or multiple singular vectors of the channel response matrix. If the UE 215 estimates the channel response matrix, the UE 215 may determine the suitable transmit beam weight and indicate it to the base station 205.

In some examples, the base station 205 may be configured to use analog beamforming techniques. In analog beamforming, the base station 205 or the UE 215 may lack the ability to obtain a channel response matrix by transmitting reference signals from each transmit antenna element in the antenna panels 210-*a* or each receive antenna element in the antenna panels 210-*b*. In analog beamforming, the number of transmit radio units (RU) is greatly smaller than the number of antennas in a transmit panel (e.g., the antenna panels 210-*a*) or a receive panel (e.g., the antenna panels 210-*b*). A transmitted signal may be precoded by multiplexing precoding weights onto each antenna in the antenna panels 210-*a*. The precoding weights may have identical amplitude such that phases may be adjusted, which may allow the receiver (e.g., the UE 215) to obtain the equivalent channel response matrix (e.g., from a transmit port to a receive port) instead of obtaining the original channel response matrix (e.g., from a transmit antenna to a receive antenna).

The UE 215 may estimate a channel response matrix for a near field line-of-sight (LOS) path. To retrieve a near-field channel response matrix, the base station 205 or the UE 215 may first model the near field LOS and non-LOS (NLOS) channel response matrix. The channel response matrix for a near field LOS path may be expressed as $$H_{LOS} = \{h_{m,n}\}_{m=1\sim N_{rx},n=1\sim N_{tx}},$$

where the channel response value is represented $$h_{m,n} = \frac{\sqrt{G}\lambda}{4\pi d_{m,n}} \exp\left(-j2\pi \frac{d_{m,n}}{\lambda}\right),$$

$\lambda$ represents a wavelength, and $d_{m,n}$ represents the distance between a pair of transmit antennas and receive antennas and is a function of angles $\theta_1$, $\theta_2$, $\theta_3$, $\theta_4$, $d_{tx}$, and $d_{rx}$ of the antennas.

Additionally or alternatively, the UE 215 may estimate a channel response matrix for a near field NLOS path. The channel response matrix for the near field NLOS path may be expressed as $$H_{NLOS} = \sum_{l=1}^{L} \alpha_l v_{rx,l} u_{tx,l}^H, \text{ where}$$

$$v_{rx,l} = [h_{rx,l}, \ldots, h_{rx,M}],\ u_{rx,l} = [h_{tx,l}, \ldots, h_{tx,N}].$$

The channel response value may be represented by $$h_{rx,j} = \frac{\sqrt{G}\lambda}{4\pi d_{m,n}} \exp\left(-j2\pi \frac{d_{rx,j}}{\lambda}\right) \text{ and } h_{tx,i} = \frac{\sqrt{G}\lambda}{4\pi d_{m,n}} \exp\left(-j2\pi \frac{d_{tx,i}}{\lambda}\right),$$

where $\lambda$ represents a wavelength, $d_{tx,i}$ represents the distance between a transmit antenna and a reflector and is a function of $\theta_1$, $\theta_2$, and $d_{tx}$, and $d_{rx,j}$ represents the distance between a receive antenna and the reflector $d_{rx,j}$ and is a function of $\theta_3$, $\theta_4$, and $d_{rx}$.

In some cases, after the base station 205 or the UE 215 obtains measurement results and the transmit parameters 245 or the receive parameters 250, the base station 205 or the UE 215 may perform a channel response matrix retrieving method. When the base station 205 and the UE 215 use a transmit precoding weight $w_{tx,k}$ and a receive combining weight $w_{rx,k}$, the received signal may be represented as $$y_k = w_{rx,k}^H(\beta_1 H_{LOS} + \beta_2 H_{NLOS}) w_{tx,k} x_k = \text{noise},$$

where $x_k$ represents the reference signal known by the UE 215. The base station 205 or the UE 215 may estimate $\hat{H}_{LOS}$ and $\hat{H}_{NLOS}$ such that $$\sum_{k=1}^{N_{measure}} \left\| w_{rx,k}^H(\beta_1 H_{LOS} + \beta_2 H_{NLOS}) w_{tx,k} x_k - y_k \right\|_2^2$$

may be minimized or may be less than a given threshold (e.g., a very small value, such as 0.001). In some cases, $\hat{H}_{LOS}$ and $\hat{H}_{NLOS}$ may be constructed based on the above-mentioned models. Thus, the estimation of $\hat{H}_{LOS}$ and $\hat{H}_{NLOS}$ may be equivalent to estimating the channel parameters $$\{\theta_{1,LOS}, \theta_{2,LOS}, \theta_{3,LOS}, \{\theta_{1,NLOS,l}, \theta_{2,NLOS,l}, \theta_{3,NLOS,l}, \theta_{4,NLOS,l}\}_{l=1\sim N}\},$$

given $d_{tx}$, $d_{rx}$, $w_{tx,k}$, $w_{rx,k}$, $x_k$, and $y_k$.

The base station 205 or the UE 215 may first estimate $\hat{H}_{LOS}$. The LOS channel parameters $\theta_{1,LOS}$, $\theta_{2,LOS}$, and $\theta_{3,LOS}$ may be estimated based on the positioning of the base station 205. The base station 205 or the UE 215 may then estimate $\hat{H}_{NLOS}$. The base station 205 or the UE 215 may subtract the component of $\hat{H}_{LOS}$ from the measured signals $\{y_k\}_{k=1\sim N_{measure}}$, and may then estimate $\hat{H}_{NLOS}$ such that the value of $$\sum_{k=1}^{N_{measure}} \left\| \left(\beta_2 w_{rx,k}^H H_{NLOS} w_{tx,k} - y_k - \beta_1 w_{rx,k}^H \hat{H}_{LOS} w_{tx,k}\right) \right\|_2^2 = \sum_{k=1}^{N_{measure}} \left\| \beta_2 w_{rx,k}^H \left(\sum_{l=1}^{L} \alpha_1 v_{rx,l} u_{tx,l}^H\right) w_{tx,k} - z_k \right\|_2^2$$

may be minimized or may be less than a given threshold $\varepsilon$ (e.g., a very small value, such as 0.001). Herein, $v_{rx,l}$ and $u_{tx,l}$ are functions of $\theta_{3,NLOS,l}$, $\theta_{4,NLOS,l}$, and $d_{rx}$, and $\theta_{1,NLOS,l}$, $\theta_{2,NLOS,l}$, and $d_{tx}$, respectively. To solve this optimization problem, a compressive sending-based algorithm or AI-based algorithm may be used. The compressive sensing-based algorithm may be rewritten in matrix form as $$\sum_{k=1}^{N_{measure}} \left\| \beta_2 w_{rx,k}^H \left(\sum_{l=1}^{L} \alpha_1 v_{rx,l} u_{tx,l}^H\right) w_{tx,k} - z_k \right\|_2^2 = \left\| \left(\beta_2 W_{rx,k}^H V_{rx} \operatorname{diag}(\alpha_{l=1\sim L}) U_{tx}^H W_{tx} - Z\right) \right\|_2^2 = \left\| \left(\beta_2 B_{rx}^H \operatorname{diag}(\alpha_{l=1\sim L}) B_{tx} - Z\right) \right\|_2^2 = \|C\alpha - z_{vec}\|_2^2, \text{ where}$$

$$\alpha \triangleq [\alpha_1, \alpha_2, \ldots, \alpha_L]^T,$$

C is a function of $\{\theta_{1,NLOS,\lambda}, \theta_{2,NLOS,\lambda}, \theta_{3,NLOS,\lambda}, \lambda_{4,NLOS,\lambda}\}=_{l=1\sim N}$ and $\{d_{tx}, d_{rx}\}$, and $z_{vec}$ is a function of $$\{y_k\}_{k=1\sim N_{measure}}$$

and $\hat{H}_{LOS}$. The optimization problem may be rewritten as $$\{\hat{a}, \{\theta_{1,NLOS,\lambda}, \theta_{2,NLOS,\lambda}, \theta_{3,NLOS,\lambda}, \theta_{4,NLOS,\lambda}\}_{l=1\sim L}\} = \operatorname{argmin}\|\hat{a}\|_0,$$

subjected to $$\|C\alpha - z_{vec}\|_2^2 < \varepsilon.$$

As such, the estimation channel parameters may have the fewest reflectors as long as the subjection condition is satisfied. This optimization problem may be solved by an orthogonal matching pursuit (OMP) algorithm with a constructed dictionary $\tilde{C}$ where each column is generated by setting certain values to $\{\theta_{1,NLOS,l}, \theta_{2,NLOS,l}, \theta_{3,NLOS,l}, \theta_{4,NLOS,l}\}$ and parameterized by $d_{tx}$ and $d_{rx}$.

Figure 3:
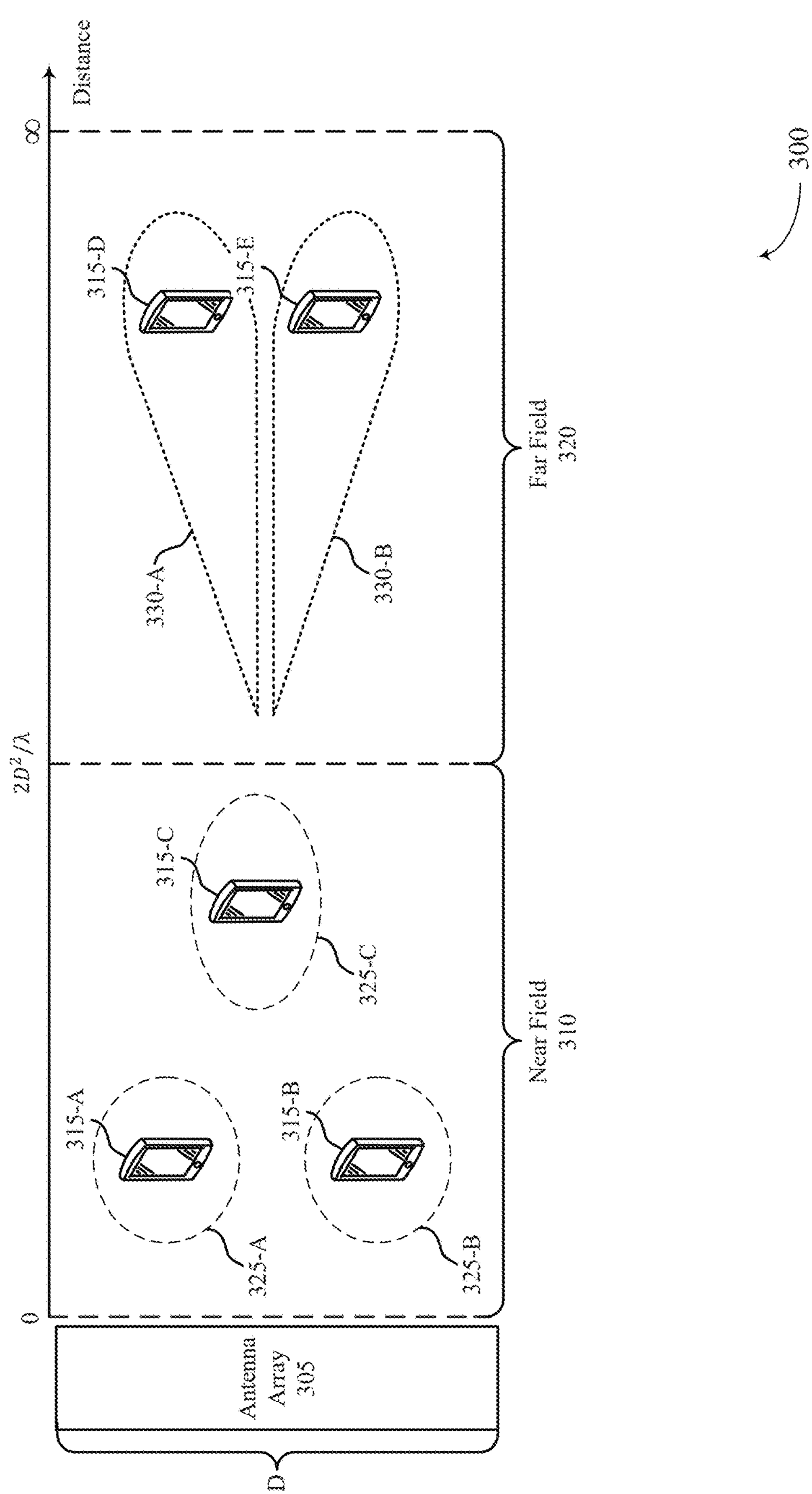
FIG. 3 illustrates an example of a wireless communications system that supports channel estimation based beam determination in holographic MIMO systems in accordance with aspects of the present disclosure.

FIG. 3 illustrates an example of a wireless communications system 300 that supports channel estimation based beam determination in holographic MIMO systems in accordance with aspects of the present disclosure. In some examples, the wireless communications system 300 may implement aspects of the wireless communications systems 100 and 200 or may be implemented by aspects of the wireless communications systems 100 and 200. For example, the wireless communications system 300 may include UEs 315, which may be examples of corresponding devices described herein with reference to FIGS. 1 and 2.

A base station (e.g., with an antenna array 305) may be configured to perform 3D holographic MIMO where the base station may form transmission beams to UEs 315 that may distinguish both direction and distance between the UEs 315 and the base station. The coverage area close to the antenna array 305 may be called a near field 310, while the coverage area far away from the antenna array 305 may be called a far field 320. For example, the near field 310 may be within a distance threshold of MIMO communications from the base station and the far field 320 may be outside of a distance threshold of MIMO communications from the base station. In some cases, the partitioning distance of the near field 310 (e.g., which may be further divided as a reactive near field and a radiating near field) and the far field 320 may depend on the antenna panel size D and a signal wavelength λ. In some cases, the near field 310 may cover a distance from 0 m to $2D^2/\lambda$ m with respect to the antenna array 305, and the far field 320 may cover a distance from $2D^2/\lambda$ m to do with respect to the antenna array 305. The near field 310 may include UEs 315, which may each be served by a 3D beam 325. For example, a UE 315-*a* may be associated with a 3D beam 325-*a*, a UE 315-*b* may be associated with a 3D beam 325-*b*, and a UE 315-*c* may be associated with a 3D beam 325-*c*. The UEs 315 in the near field 310 may communicate with a base station using holographic MIMO beamforming. The far field 320 may include different UEs 315, which may each be served by a 2D beam 330 pointing to each UE 315. For example, a UE 315-*d* may be associated with a 2D beam 330-*a* and a UE 315-*e* may be associated with a 2D beam 330-*b*. The UEs 315 in the far field 320 may communicate with the base station using NR MIMO beamforming techniques. As the near field 310 and the far field 320 depend on wavelength, the area of the near field 310 may become larger with higher frequency bands.

In some cases, channel response may differ based on whether a UE 315 is in the near field 310 or the far field 320 of the antenna array 305. When a UE 315 is located in the far field 320 of the antenna array 305 of the base station (e.g., the UE 315-*d*, the UE 315-*e*), the received signal at a receive antenna panel at the UE 315-*d* or the UE 315-*e* may be approximated to be a planar wave. Therefore, when the base station or the UE 315 performs beam determination and channel estimation, the base station or the UE 315 may be concerned about the angle between the panel boresight direction and the signal departure and signal arrival directions. The complex channel response value from one transmit antenna in the antenna array 305 to each receive antennas (e.g., at the UEs 315) or from each transmit antenna in the antenna array 305 to one receive antenna (e.g., at a UE 315) may have equal amplitudes but different phases. However, when a UE 315 is located in the near field 310 of the antenna array 305 of the base station (e.g., the UE 315-*a*, the UE 315-*b*, the UE 315-*c*), the received signal at the receive panel of the UE 315-*a*, the UE 315-*b*, or the UE 315-*c* may be approximated as something other than a planar wave. Therefore, when the base station or the UE 315 performs beam determination and channel estimation, the base station or the UE 315 may be additionally concerned about the differences of channel response amplitudes at different transmit and receive antennas. Such channel response amplitude differences may depend on the distance between the transmit panel, the receive panel, and a reflector (e.g., between the transmit panel and the receive panel), and the transmit and receive antenna panel lengths.

In some cases, the base station and a UE 315 may perform a channel estimation-based beam determination scheme in the holographic MIMO system. The base station may indicate a field type (e.g., near field or far field) to a UE 315. If the UE 315 is in the near field 310, the base station may transmit a beamformed data signal (e.g., a reference signal) to the UE 315 and the base station may indicate transmit panel information such as a transmit antenna panel length and a number of transmit antennas, among other information, to the UE 315. The UE 315 may use the beamformed data signal and the transmit panel information to estimate a channel response matrix and determine transmit beamforming weights. Additionally or alternatively, the UE 315 may indicate receive panel information such as a receive antenna panel length and a number of receive antennas, among other information, to the base station, which the base station may use to estimate the channel response matrix and determine receive beamforming weights.

Figure 4:
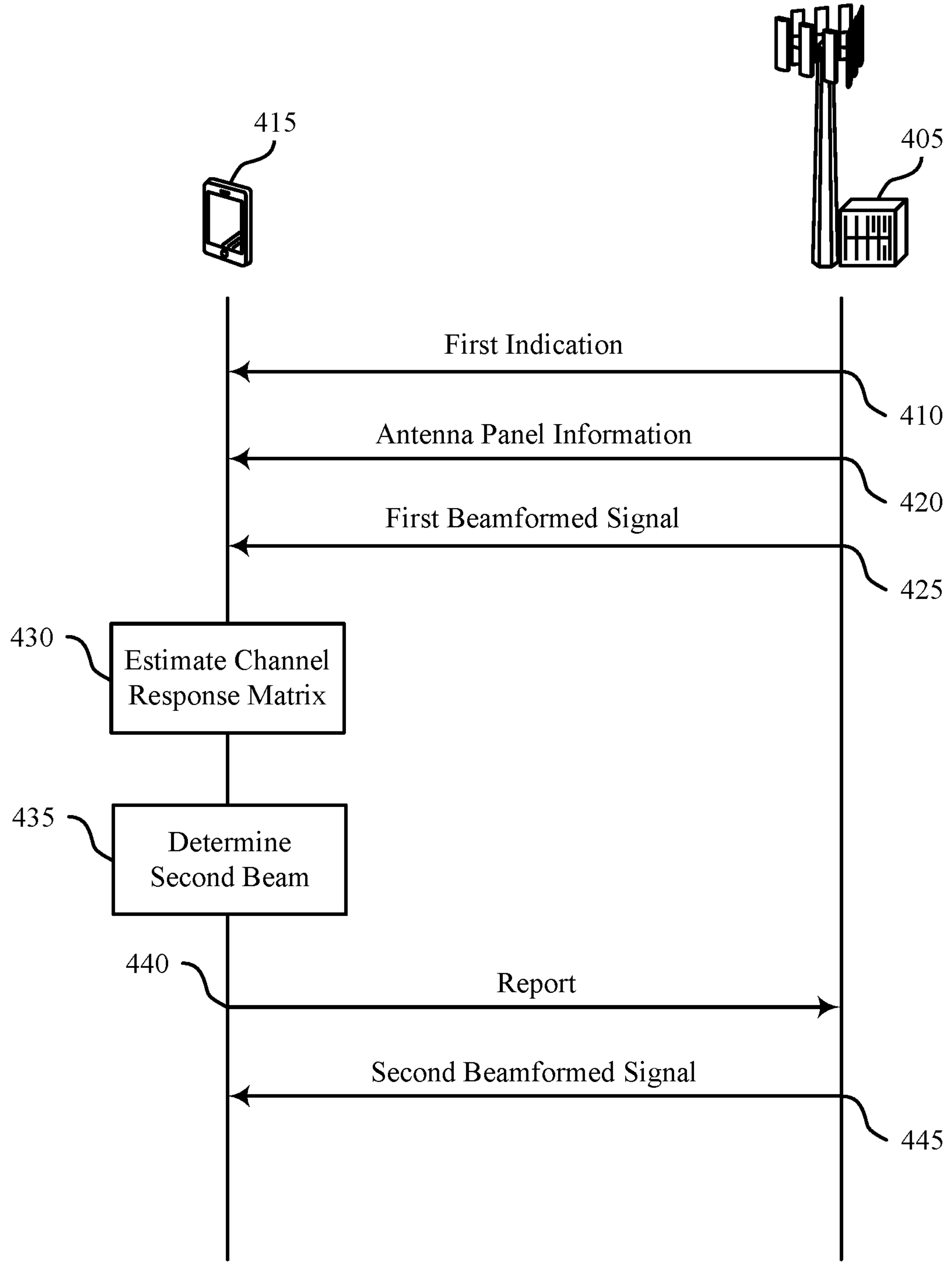
FIGS. 4 and 5 illustrate examples of process flows that supports channel estimation based beam determination in holographic MIMO systems in accordance with aspects of the present disclosure.

FIG. 4 illustrates an example of a process flow 400 that supports channel estimation based beam determination in holographic MIMO systems in accordance with aspects of the present disclosure. The process flow 400 may implement aspects of wireless communications systems 100 and 200, or may be implemented by aspects of the wireless communications system 100 and 200. For example, the process flow 400 may illustrate operations between a UE 415 and a base station 405, which may be examples of corresponding devices described with reference to FIGS. 1 and 2. In the following description of the process flow 400, the operations between the UE 415 and the base station 405 may be transmitted in a different order than the example order shown, or the operations performed by the UE 415 and the base station 405 may be performed in different orders or at different times. Some operations may also be omitted from the process flow 400, and other operations may be added to the process flow 400.

At 410, the UE 415 may receive, from the base station 405, a first indication that the UE 415 is within a distance threshold of MIMO communications from the base station 405. For example, the UE 415 may be in the near field of the base station 405 (e.g., instead of in the far field or outside of the distance threshold).

At 420, the UE 415 may receive, from the base station 405, signaling that includes a second indication of antenna panel information of the base station 405. In some cases, the signaling received at the UE 415 may be based on the UE 415 being within the threshold distance of the MIMO communications from the base station 405. In some examples, the UE 415 may receive transmit antenna panel information from the base station 405 including a transmit panel length, a number of transmit antennas, antenna positions in the transmit antenna panel, transmit beamforming weights, and the like.

At 425, the UE 415 may receive, from the base station 405, a first beamformed signal on one or more first beams within the distance threshold of the MIMO communications. In some cases, the first beamformed signal may include a beamformed data signal or a reference signal (e.g., a CSI-RS). In some cases, the UE 415 may receive the first beamformed signal at the same time as the transmit antenna panel information or before receiving the transmit panel information.

At 430, the UE 415 may estimate a channel response matrix based on the antenna panel information from the base station 405 (e.g., transmit antenna panel information) and the first beamformed signal. At 435, the UE 415 may determine the second beam based on the channel response matrix estimated from the antenna panel information from the base station 405 (e.g., transmit antenna panel information) and the first beamformed signal. For example, the UE 415 may determine beamforming weights based on the estimated channel response matrix and determine a suitable receive beam based on the weights.

At 440, the UE 415 may transmit, to the base station 405, a report indicating the channel response matrix estimated by the UE 415 based on the antenna panel information from the base station 405 and the first beamformed signal. In some cases, the report may indicate the second beam to be used for one or more second beamformed signals. At 450, the UE 415 may receive, from the base station 405, the one or more second beamformed signals on a second beam within the distance threshold of the MIMO communications, wherein the second beam is based at least in part on the channel response matrix that is estimated from at least the second indication and the first beamformed signal.

Figure 5:
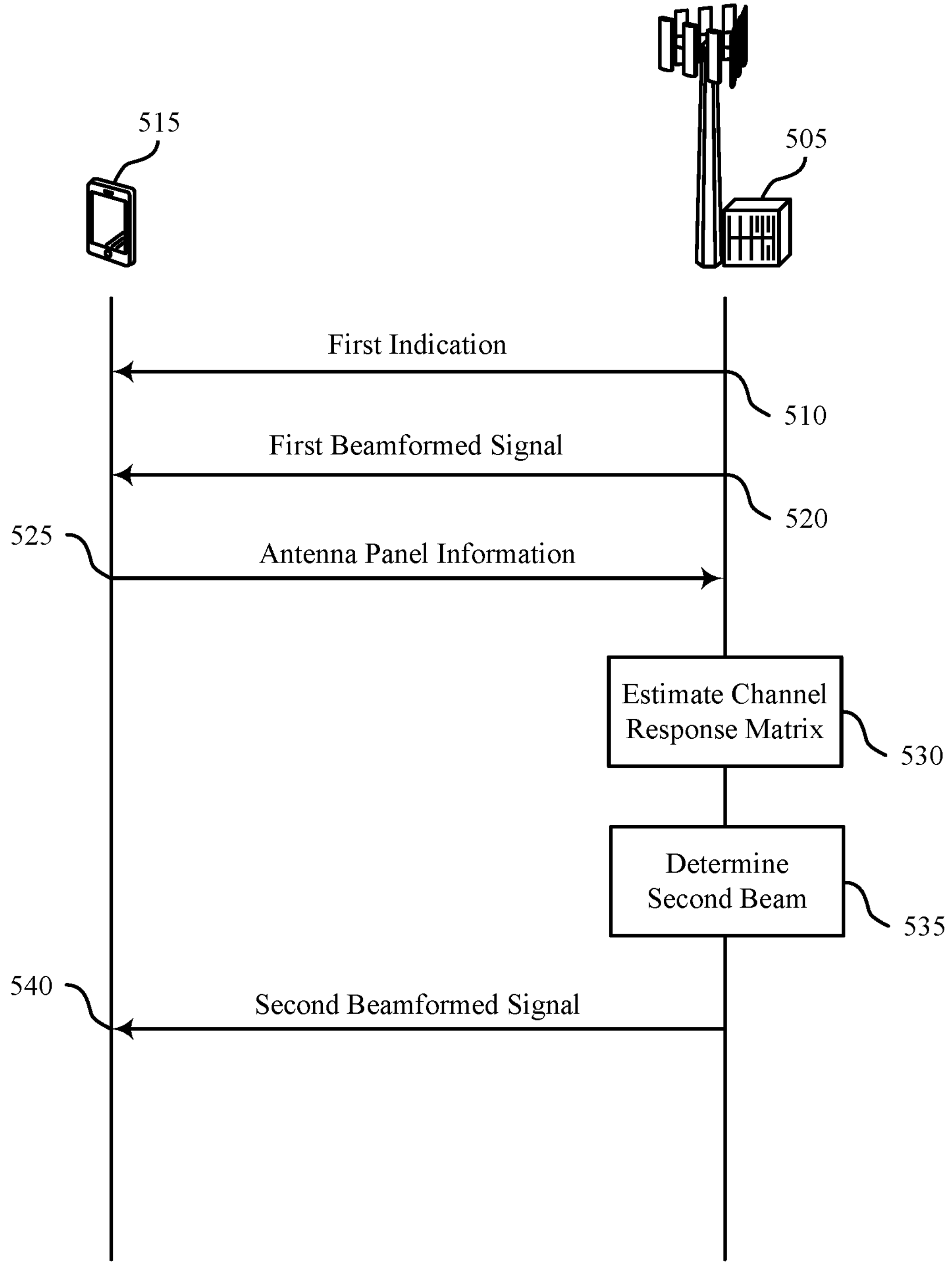

FIG. 5 illustrates an example of a process flow 400 that supports channel estimation based beam determination in holographic MIMO systems in accordance with aspects of the present disclosure. The process flow 500 may implement aspects of wireless communications systems 100 and 200, or may be implemented by aspects of the wireless communications system 100 and 200. For example, the process flow 500 may illustrate operations between a UE 515 and a base station 505, which may be examples of corresponding devices described with reference to FIGS. 1 and 2. In the following description of the process flow 500, the operations between the UE 515 and the base station 505 may be transmitted in a different order than the example order shown, or the operations performed by the UE 515 and the base station 505 may be performed in different orders or at different times. Some operations may also be omitted from the process flow 500, and other operations may be added to the process flow 500.

At 510, the base station 505 may transmit, to the UE 515, a first indication that the UE 515 is within a distance threshold of MIMO communications from the base station 505. For example, the UE 515 may be in the near field of the base station 505 (e.g., instead of in the far field or outside of the distance threshold).

At 520, the base station 505 may transmit, to the UE 515, a first beamformed signal on one or more first beams within the distance threshold of the MIMO communications. In some cases, the first beamformed signal may include a beamformed data signal or a reference signal (e.g., a CSI-RS).

At 525, the base station 505 may receive, from the UE 515, signaling that includes a second indication of antenna panel information of the UE 515. In some cases, the signaling received at the base station 505 may be based on the UE 515 being within the threshold distance of the MIMO communications from the base station 505. In some examples, the base station 505 may receive, from the UE 415, receive antenna panel information including a receive panel length, a number of receive antennas, antenna positions in the receive antenna panel, receive beamforming weights, and the like. In some examples, the base station 505 may receive, from the UE 515, the signaling after analog receive antenna combining.

At 530, the base station 505 may estimate a channel response matrix based on the antenna panel information from the UE 515 (e.g., receive antenna panel information) and the first beamformed signal.

At 535, the base station 505 may determine the second beam based on the channel response matrix estimated from the antenna panel information from the UE 515 (e.g., receive antenna panel information) and the first beamformed signal. For example, the base station 505 may determine beamforming weights based on the estimated channel response matrix and determine a suitable transmit beam based on the weights.

At 540, the base station 505 may transmit, to the UE 515, one or more second beamformed signals on a second beam within the distance threshold of the MIMO communications, wherein the second beam is based at least in part on the channel response matrix that is estimated from at least the second indication and the first beamformed signal.

Figure 6:
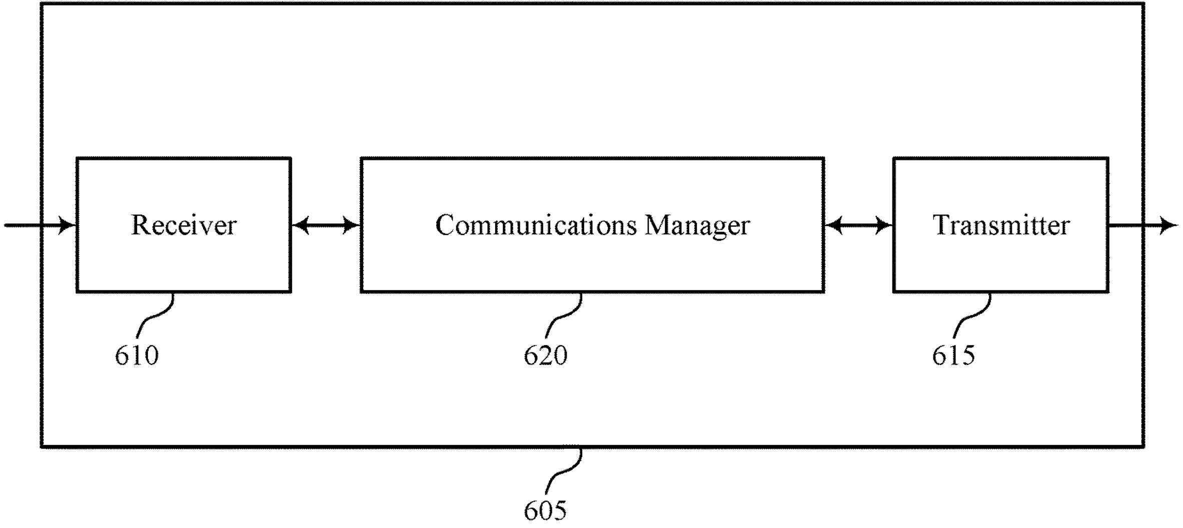
FIGS. 6 and 7 show block diagrams of devices that support channel estimation based beam determination in holographic MIMO systems in accordance with aspects of the present disclosure.

FIG. 6 shows a block diagram 600 of a device 605 that supports channel estimation based beam determination in holographic MIMO systems in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel estimation based beam determination in holographic MIMO). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel estimation based beam determination in holographic MIMO). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel estimation based beam determination in holographic MIMO systems as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, a first indication that the UE is within a distance threshold of MIMO communications from the base station. The communications manager 620 may be configured as or otherwise support a means for communicating with the base station via signaling that includes a second indication of antenna panel information of at least one of the UE or the base station, the signaling transmitted by the UE or received at the UE based on the UE being within the distance threshold of the MIMO communications from the base station. The communications manager 620 may be configured as or otherwise support a means for receiving, from the base station, a first beamformed signal on one or more first beams within the distance threshold of the MIMO communications. The communications manager 620 may be configured as or otherwise support a means for receiving, from the base station, one or more second beamformed signals on a second beam within the distance threshold of the MIMO communications, where the second beam is based on a channel response matrix that is estimated from at least the second indication and the first beamformed signal.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for channel estimation-based beam determination in holographic MIMO systems, which may reduce signaling overhead and determination latency and improve beamforming gain. As such, supported techniques may include network operations, and, in some examples, may promote network efficiencies, among other benefits.

Figure 7:
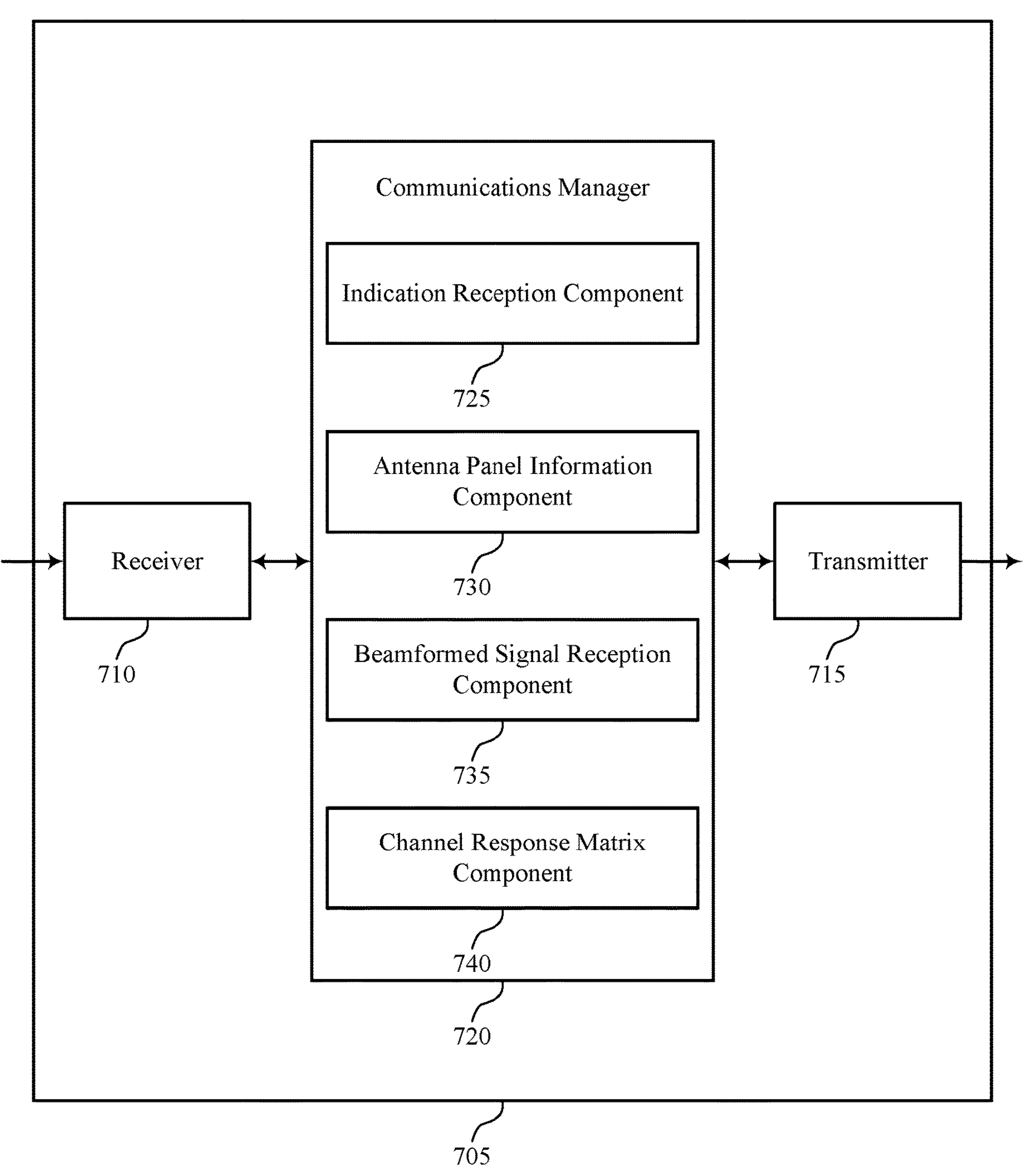

FIG. 7 shows a block diagram 700 of a device 705 that supports channel estimation based beam determination in holographic MIMO systems in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel estimation based beam determination in holographic MIMO systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel estimation based beam determination in holographic MIMO systems). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel estimation based beam determination in holographic MIMO systems as described herein. For example, the communications manager 720 may include an indication reception component 725, an antenna panel information component 730, a beamformed signal reception component 735, a channel response matrix component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The indication reception component 725 may be configured as or otherwise support a means for receiving, from a base station, a first indication that the UE is within a distance threshold of MIMO communications from the base station. The antenna panel information component 730 may be configured as or otherwise support a means for communicating with the base station via signaling that includes a second indication of antenna panel information of at least one of the UE or the base station, the signaling transmitted by the UE or received at the UE based on the UE being within the distance threshold of the MIMO communications from the base station. The beamformed signal reception component 735 may be configured as or otherwise support a means for receiving, from the base station, a first beamformed signal on one or more first beams within the distance threshold of the MIMO communications. The channel response matrix component 740 may be configured as or otherwise support a means for receiving, from the base station, one or more second beamformed signals on a second beam within the distance threshold of the MIMO communications, where the second beam is based on a channel response matrix that is estimated from at least the second indication and the first beamformed signal.

Figure 8:
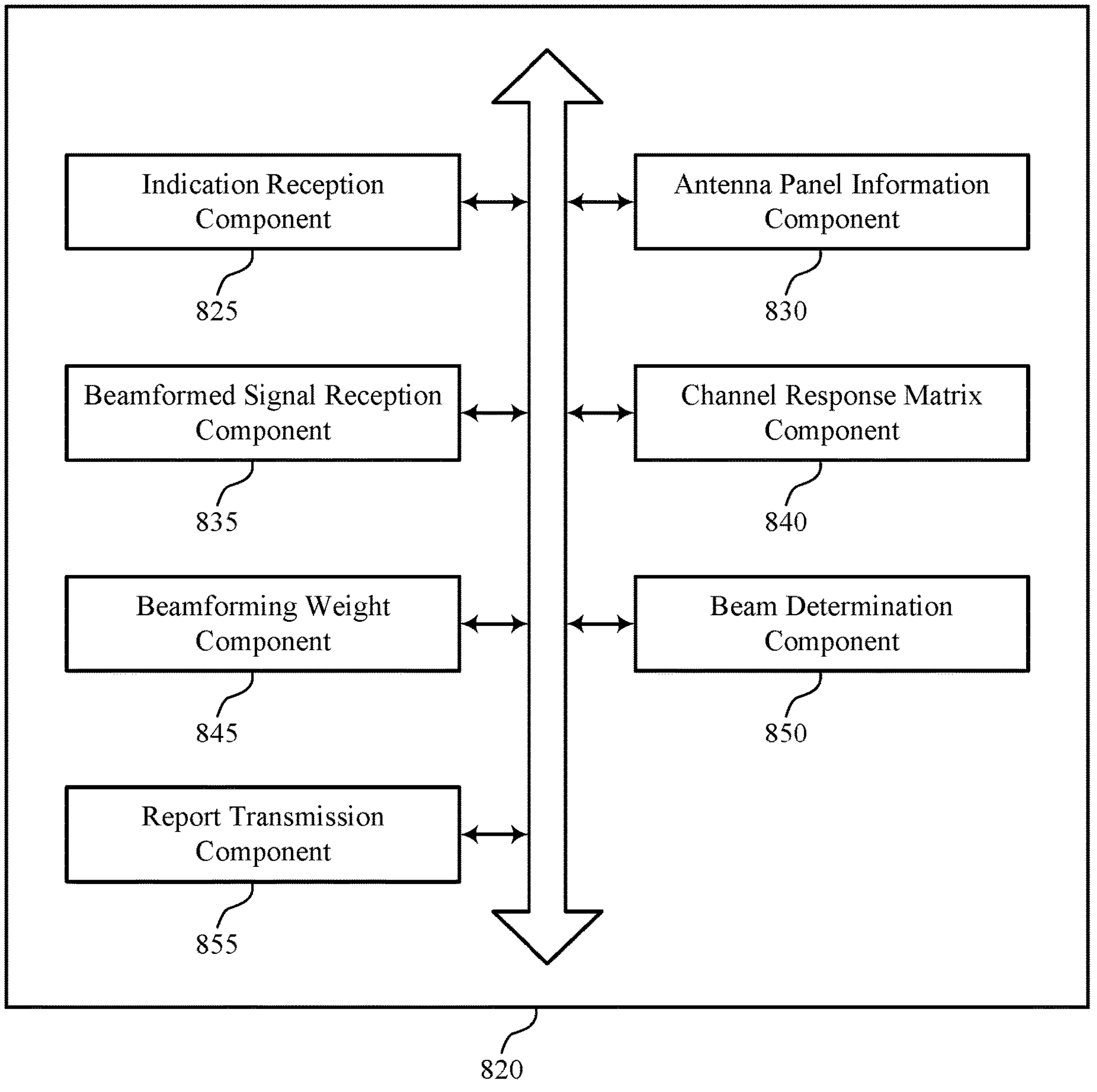
FIG. 8 shows a block diagram of a communications manager that supports channel estimation based beam determination in holographic MIMO systems in accordance with aspects of the present disclosure.

FIG. 8 shows a block diagram 800 of a communications manager 820 that supports channel estimation based beam determination in holographic MIMO systems in accordance with aspects of the present disclosure. The communications manager 820 may be an example of aspects of a communications manager 620, a communications manager 720, or both, as described herein. The communications manager 820, or various components thereof, may be an example of means for performing various aspects of channel estimation based beam determination in holographic MIMO systems as described herein. For example, the communications manager 820 may include an indication reception component 825, an antenna panel information component 830, a beamformed signal reception component 835, a channel response matrix component 840, a beamforming weight component 845, a beam determination component 850, a report transmission component 855, or any combination thereof. Each of these components may communicate, directly or indirectly, with one another (e.g., via one or more buses).

The communications manager 820 may support wireless communication at a UE in accordance with examples as disclosed herein. The indication reception component 825 may be configured as or otherwise support a means for receiving, from a base station, a first indication that the UE is within a distance threshold of MIMO communications from the base station. The antenna panel information component 830 may be configured as or otherwise support a means for communicating with the base station via signaling that includes a second indication of antenna panel information of at least one of the UE or the base station, the signaling transmitted by the UE or received at the UE based on the UE being within the distance threshold of the MIMO communications from the base station. The beamformed signal reception component 835 may be configured as or otherwise support a means for receiving, from the base station, a first beamformed signal on one or more first beams within the distance threshold of the MIMO communications. The channel response matrix component 840 may be configured as or otherwise support a means for receiving, from the base station, one or more second beamformed signals on a second beam within the distance threshold of the MIMO communications, where the second beam is based on a channel response matrix that is estimated from at least the second indication and the first beamformed signal.

In some examples, to support communicating with the base station via the signaling, the antenna panel information component 830 may be configured as or otherwise support a means for receiving the second indication of the antenna panel information from the base station, the antenna panel information being for one or more transmit panels of the base station.

In some examples, the channel response matrix component 840 may be configured as or otherwise support a means for estimating the channel response matrix based on the antenna panel information from the base station and the first beamformed signal.

In some examples, the beam determination component 850 may be configured as or otherwise support a means for determining the second beam based on the channel response matrix estimated from the antenna panel information from the base station and the first beamformed signal.

In some examples, the report transmission component 855 may be configured as or otherwise support a means for transmitting, to the base station, a report indicating the channel response matrix estimated by the UE based on the antenna panel information from the base station and the first beamformed signal.

In some examples, the report transmission component 855 may be configured as or otherwise support a means for transmitting, to the base station, a report indicating the second beam to be used for the one or more second beamformed signals, the second beam determined based on the channel response matrix estimated from the antenna panel information from the base station and the first beamformed signal.

In some examples, to support communicating with the base station via the signaling, the antenna panel information component 830 may be configured as or otherwise support a means for transmitting the second indication of the antenna panel information from the UE to the base station, the antenna panel information being for one or more receive panels of the UE.

In some examples, to support receiving the first indication that the UE is within the distance threshold of the MIMO communications from the base station, the indication reception component 825 may be configured as or otherwise support a means for receiving the first indication in a system information message or via a unicast or multicast message.

In some examples, the indication reception component 825 may be configured as or otherwise support a means for receiving the first indication that the UE is within the distance threshold of MIMO communications from the base station is an alternative to receiving notice that the UE is outside of the distance threshold of the MIMO communications from the base station.

In some examples, to support receiving the first beamformed signal on the one or more first beams within the distance threshold of the MIMO communications, the beamformed signal reception component 835 may be configured as or otherwise support a means for receiving the first beamformed signal as a beamformed data signal or a reference signal.

In some examples, to support receiving the first beamformed signal on the one or more first beams within the distance threshold of the MIMO communications, the beamformed signal reception component 835 may be configured as or otherwise support a means for taking measurements of the first beamformed signal on the one or more first beams, where a number of beams on which the measurements are taken is greater than a number of reflectors between the UE and the base station, and where the one or more first beams are beams directed towards the UE, randomly-directed beams, or both.

In some examples, the antenna panel information is for either one or more transmit panels of the base station or one or more receive panels of the UE, and where the antenna panel information includes a panel length, a number of antennas per panel, positions of the antennas per panel, or a combination thereof.

In some examples, to support communicating with the base station via the signaling, the antenna panel information component 830 may be configured as or otherwise support a means for communicating the second indication of the antenna panel information during a connection setup procedure between the base station and the UE or after a change in either a transmit panel of the base station or a receive panel of the UE.

In some examples, to support communicating with the base station via the signaling, the beamforming weight component 845 may be configured as or otherwise support a means for communicating, with the antenna panel information, beamforming weight information indicative of beamforming weights used either by the base station to transmit the first beamformed signal or by the UE to receive the first beamformed signal.

In some examples, the beamforming weight information includes one or more indices of codewords that represent the beamforming weights, and where each of the beamforming weights is associated with one of the one or more first beams.

Figure 9:
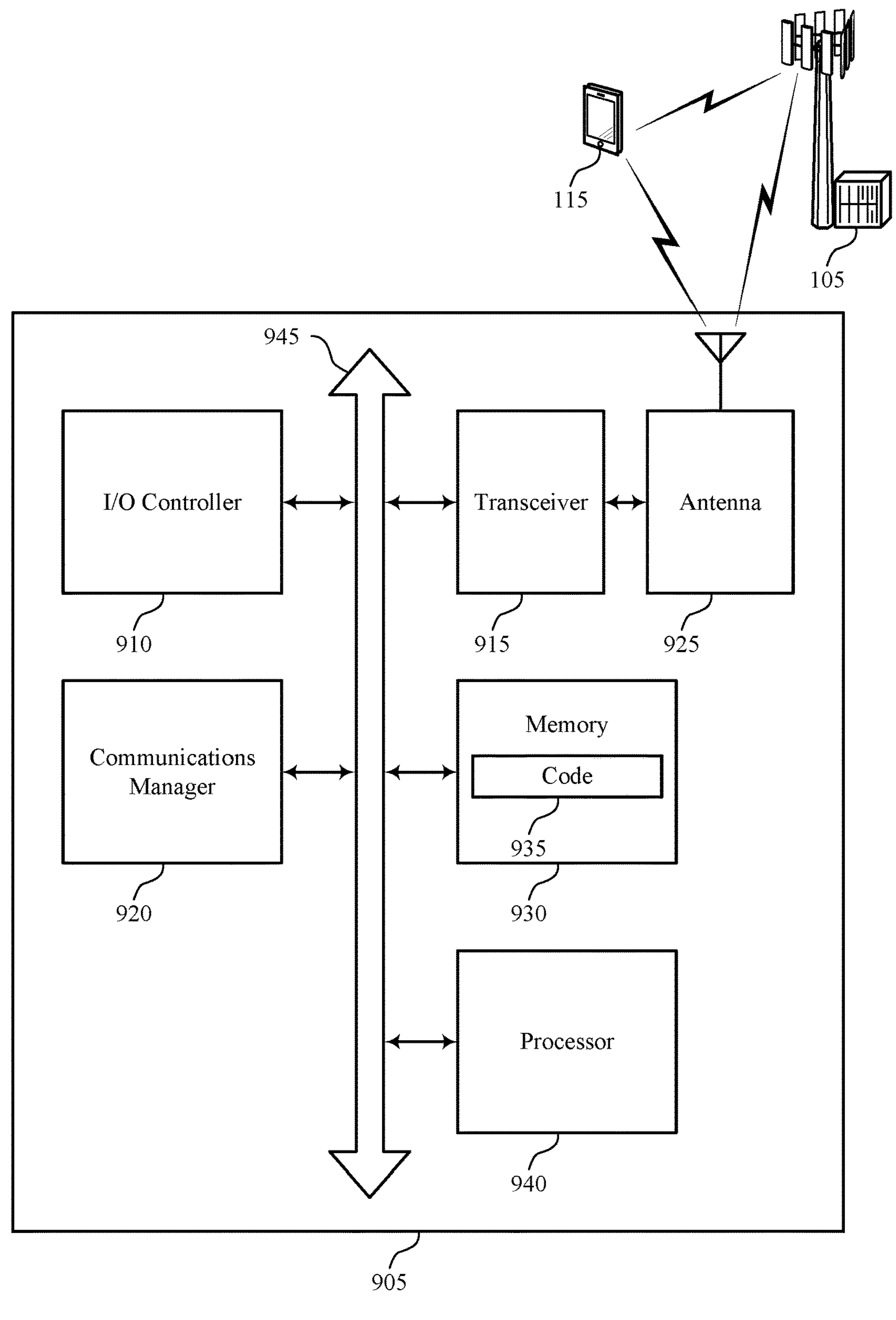
FIG. 9 shows a diagram of a system including a device that supports channel estimation based beam determination in holographic MIMO systems in accordance with aspects of the present disclosure.

FIG. 9 shows a diagram of a system 900 including a device 905 that supports channel estimation based beam determination in holographic MIMO systems in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel estimation based beam determination in holographic MIMO systems). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, a first indication that the UE is within a distance threshold of MIMO communications from the base station. The communications manager 920 may be configured as or otherwise support a means for communicating with the base station via signaling that includes a second indication of antenna panel information of at least one of the UE or the base station, the signaling transmitted by the UE or received at the UE based on the UE being within the distance threshold of the MIMO communications from the base station. The communications manager 920 may be configured as or otherwise support a means for receiving, from the base station, a first beamformed signal on one or more first beams within the distance threshold of the MIMO communications. The communications manager 920 may be configured as or otherwise support a means for receiving, from the base station, one or more second beamformed signals on a second beam within the distance threshold of the MIMO communications, where the second beam is based on a channel response matrix that is estimated from at least the second indication and the first beamformed signal.

By including or configuring the communications manager 920 in accordance with examples as described herein, the device 905 may support techniques for channel estimation-based beam determination in holographic MIMO systems, which may reduce signaling overhead and determination latency and improve beamforming gain. As such, supported techniques may include network operations, and, in some examples, may promote network efficiencies, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code

935, or any combination thereof. For example, the code 935 may include instructions executable by the processor 940 to cause the device 905 to perform various aspects of channel estimation based beam determination in holographic MIMO systems as described herein, or the processor 940 and the memory 930 may be otherwise configured to perform or support such operations.

Figure 10:
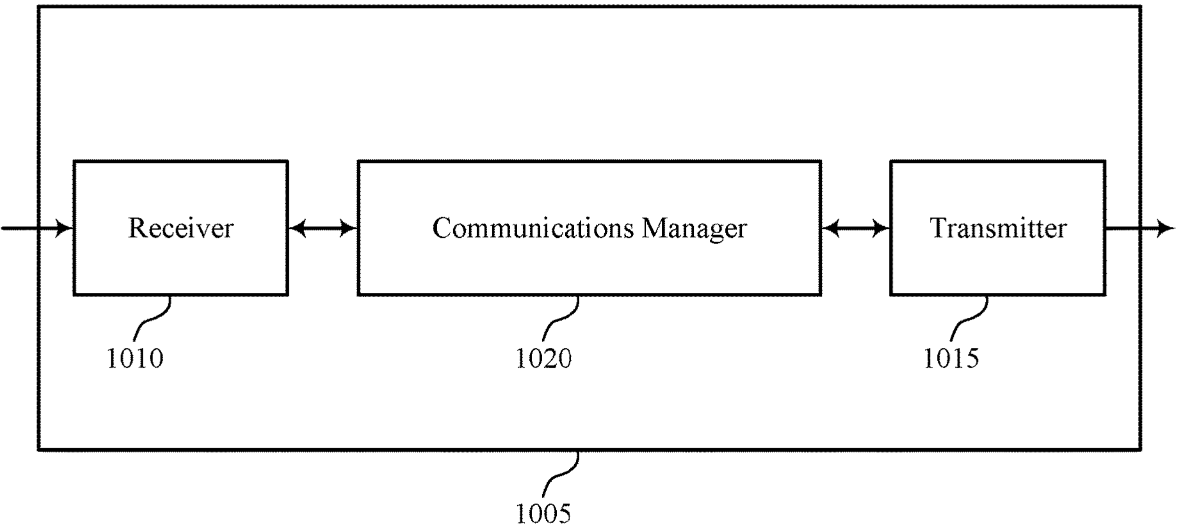
FIGS. 10 and 11 show block diagrams of devices that support channel estimation based beam determination in holographic MIMO systems in accordance with aspects of the present disclosure.

FIG. 10 shows a block diagram 1000 of a device 1005 that supports channel estimation based beam determination in holographic MIMO systems in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel estimation based beam determination in holographic MIMO systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel estimation based beam determination in holographic MIMO systems). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of channel estimation based beam determination in holographic MIMO systems as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, a first indication that the UE is within a distance threshold of MIMO communications from the base station. The communications manager 1020 may be configured as or otherwise support a means for communicating with the UE via signaling that includes a second indication of antenna panel information of at least one of the UE or the base station, the signaling transmitted by the UE or received at the UE based on the UE being within the distance threshold of the MIMO communications from the base station. The communications manager 1020 may be configured as or otherwise support a means for transmitting, to the UE, a first beamformed signal on one or more first beams within the distance threshold of the MIMO communications. The communications manager 1020 may be configured as or otherwise support a means for transmitting, to the UE, one or more second beamformed signals on a second beam within the distance threshold of the MIMO communications, where the second beam is based on a channel response matrix that is estimated from at least the second indication and the first beamformed signal.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for channel estimation-based beam determination in holographic MIMO systems, which may reduce signaling overhead and determination latency and improve beamforming gain. As such, supported techniques may include network operations, and, in some examples, may promote network efficiencies, among other benefits.

Figure 11:
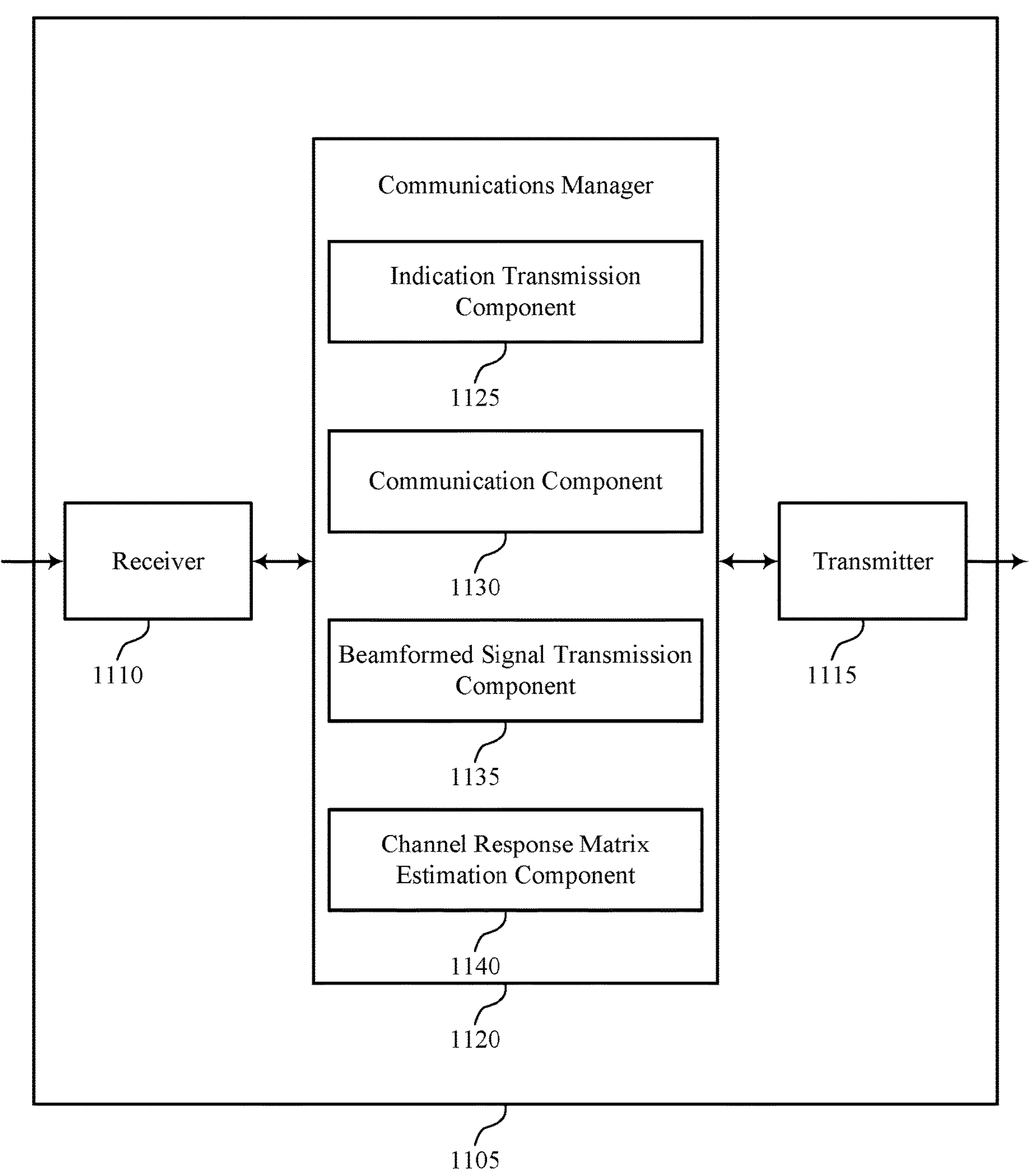

FIG. 11 shows a block diagram 1100 of a device 1105 that supports channel estimation based beam determination in holographic MIMO systems in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to channel estimation based beam determination in holographic MIMO systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to channel estimation based beam determination in holographic MIMO systems). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of channel estimation based beam determination in holographic MIMO systems as described herein. For example, the communications manager 1120 may include an indication transmission component 1125, a communication component 1130, a beamformed signal transmission component 1135, a channel response matrix estimation component 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The indication transmission component 1125 may be configured as or otherwise support a means for transmitting, to a UE, a first indication that the UE is within a distance threshold of MIMO communications from the base station. The communication component 1130 may be configured as or otherwise support a means for communicating with the UE via signaling that includes a second indication of antenna panel information of at least one of the UE or the base station, the signaling transmitted by the UE or received at the UE based on the UE being within the distance threshold of the MIMO communications from the base station. The beamformed signal transmission component 1135 may be configured as or otherwise support a means for transmitting, to the UE, a first beamformed signal on one or more first beams within the distance threshold of the MIMO communications. The channel response matrix estimation component 1140 may be configured as or otherwise support a means for transmitting, to the UE, one or more second beamformed signals on a second beam within the distance threshold of the MIMO communications, where the second beam is based on a channel response matrix that is estimated from at least the second indication and the first beamformed signal.

Figure 12:
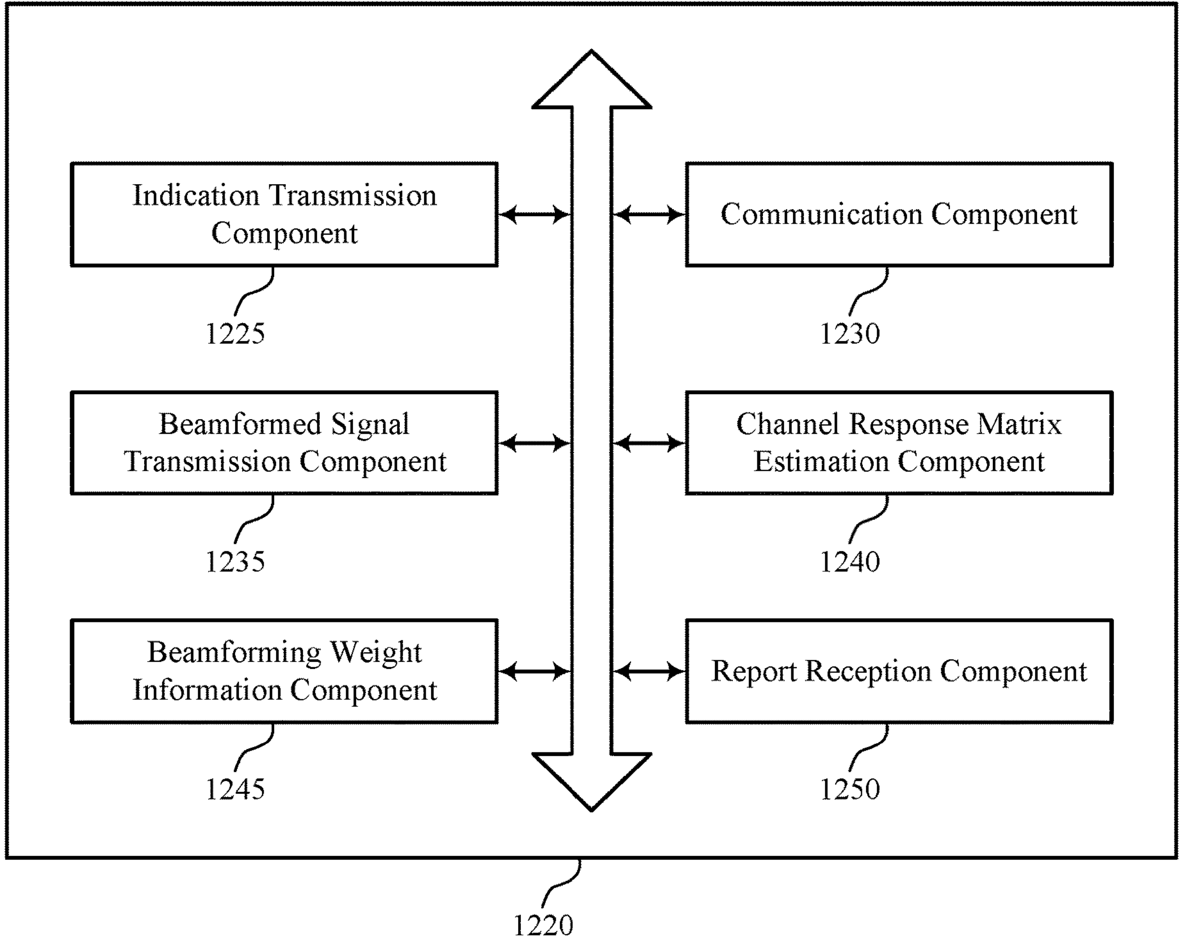
FIG. 12 shows a block diagram of a communications manager that supports channel estimation based beam determination in holographic MIMO systems in accordance with aspects of the present disclosure.

FIG. 12 shows a block diagram 1200 of a communications manager 1220 that supports channel estimation based beam determination in holographic MIMO systems in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of channel estimation based beam determination in holographic MIMO systems as described herein. For example, the communications manager 1220 may include an indication transmission component 1225, a communication component 1230, a beamformed signal transmission component 1235, a channel response matrix estimation component 1240, a beamforming weight information component 1245, a report reception component 1250, or any combination thereof. Each of these components may communicate, directly or indirectly, with one another (e.g., via one or more buses).

The communications manager 1220 may support wireless communication at a base station in accordance with examples as disclosed herein. The indication transmission component 1225 may be configured as or otherwise support a means for transmitting, to a UE, a first indication that the UE is within a distance threshold of MIMO communications from the base station. The communication component 1230 may be configured as or otherwise support a means for communicating with the UE via signaling that includes a second indication of antenna panel information of at least one of the UE or the base station, the signaling transmitted by the UE or received at the UE based on the UE being within the distance threshold of the MIMO communications from the base station. The beamformed signal transmission component 1235 may be configured as or otherwise support a means for transmitting, to the UE, a first beamformed signal on one or more first beams within the distance threshold of the MIMO communications. The channel response matrix estimation component 1240 may be configured as or otherwise support a means for transmitting, to the UE, one or more second beamformed signals on a second beam within the distance threshold of the MIMO communications, where the second beam is based on a channel response matrix that is estimated from at least the second indication and the first beamformed signal.

In some examples, to support communicating with the UE via the signaling, the communication component 1230 may be configured as or otherwise support a means for receiving the second indication of the antenna panel information from the UE, the antenna panel information being for one or more receive panels of the UE.

In some examples, the channel response matrix estimation component 1240 may be configured as or otherwise support a means for estimating the channel response matrix based on the antenna panel information from the UE and the first beamformed signal.

In some examples, the channel response matrix estimation component 1240 may be configured as or otherwise support a means for determining the second beam based on the channel response matrix estimated from the antenna panel information from the UE and the first beamformed signal.

In some examples, the report reception component 1250 may be configured as or otherwise support a means for receiving, from the UE, a report indicating the channel response matrix estimated by the UE based on the antenna panel information from the base station and the first beamformed signal.

In some examples, the report reception component 1250 may be configured as or otherwise support a means for receiving, from the UE, a report indicating the second beam to be used for the one or more second beamformed signals, the second beam determined based on the channel response matrix estimated from the antenna panel information from the base station and the first beamformed signal.

In some examples, to support communicating with the base station via the signaling, the communication component 1230 may be configured as or otherwise support a means for transmitting the second indication of the antenna panel information from the base station to the UE, the antenna panel information being for one or more transmit panels of the base station.

In some examples, to support transmitting the first indication that the UE is within the distance threshold of the MIMO communications from the base station, the indication transmission component 1225 may be configured as or otherwise support a means for transmitting the first indication in a system information message or via a unicast or multicast message.

In some examples, transmitting the first indication that the UE is within the distance threshold of MIMO communications from the base station is an alternative to transmitting notice that the UE is outside of the distance threshold of the MIMO communications from the base station.

In some examples, to support transmitting the first beamformed signal on the one or more first beams within the distance threshold of the MIMO communications, the beamformed signal transmission component 1235 may be configured as or otherwise support a means for transmitting the first beamformed signal as a beamformed data signal or a reference signal.

In some examples, the antenna panel information is for either one or more transmit panels of the base station or one or more receive panels of the UE, and where the antenna panel information includes a panel length, a number of antennas per panel, positions of the antennas per panel, or a combination thereof.

In some examples, to support communicating with the UE via the signaling, the communication component 1230 may be configured as or otherwise support a means for communicating the second indication of the antenna panel information during a connection setup procedure between the base station and the UE or after a change in either a transmit panel of the base station or a receive panel of the UE.

In some examples, to support communicating with the UE via the signaling, the beamforming weight information component 1245 may be configured as or otherwise support a means for communicating, with the antenna panel information, beamforming weight information indicative of beamforming weights used either by the base station to transmit the first beamformed signal or by the UE to receive the first beamformed signal.

Figure 13:
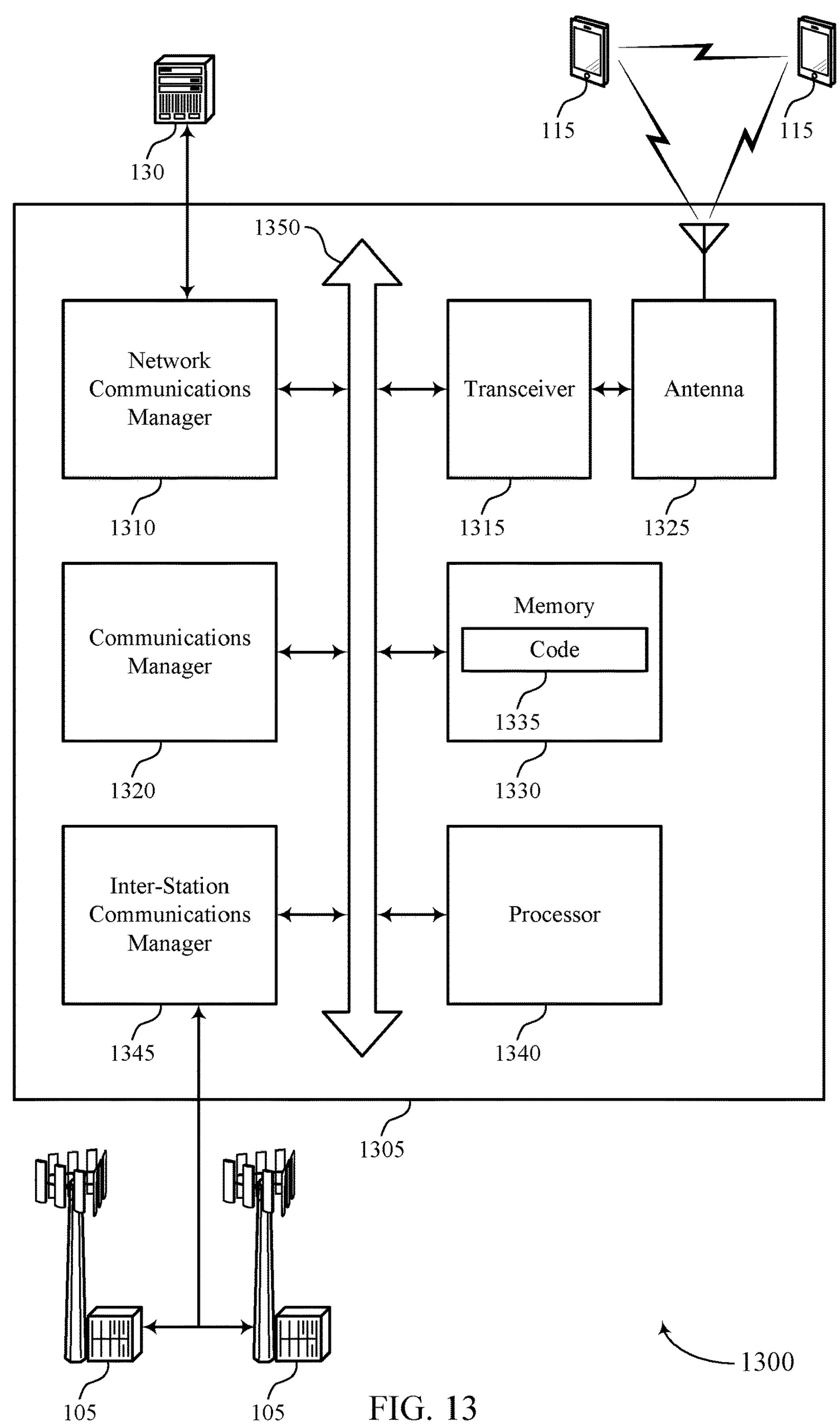
FIG. 13 shows a diagram of a system including a device that supports channel estimation based beam determination in holographic MIMO systems in accordance with aspects of the present disclosure.

FIG. 13 shows a diagram of a system 1300 including a device 1305 that supports channel estimation based beam determination in holographic MIMO systems in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting channel estimation based beam determination in holographic MIMO systems). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, a first indication that the UE is within a distance threshold of MIMO communications from the base station. The communications manager 1320 may be configured as or otherwise support a means for communicating with the UE via signaling that includes a second indication of antenna panel information of at least one of the UE or the base station, the signaling transmitted by the UE or received at the UE based on the UE being within the distance threshold of the MIMO communications from the base station. The communications manager 1320 may be configured as or otherwise support a means for transmitting, to the UE, a first beamformed signal on one or more first beams within the distance threshold of the MIMO communications. The communications manager 1320 may be configured as or otherwise support a means for transmitting, to the UE, one or more second beamformed signals on a second beam within the distance threshold of the MIMO communications, where the second beam is based on a channel response matrix that is estimated from at least the second indication and the first beamformed signal.

By including or configuring the communications manager 1320 in accordance with examples as described herein, the device 1305 may support techniques for channel estimation-based beam determination in holographic MIMO systems, which may reduce signaling overhead and determination latency and improve beamforming gain. As such, supported techniques may include network operations, and, in some examples, may promote network efficiencies, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of channel estimation based beam determination in holographic MIMO systems as described herein, or the processor 1340 and the memory 1330 may be otherwise configured to perform or support such operations.

Figure 14:
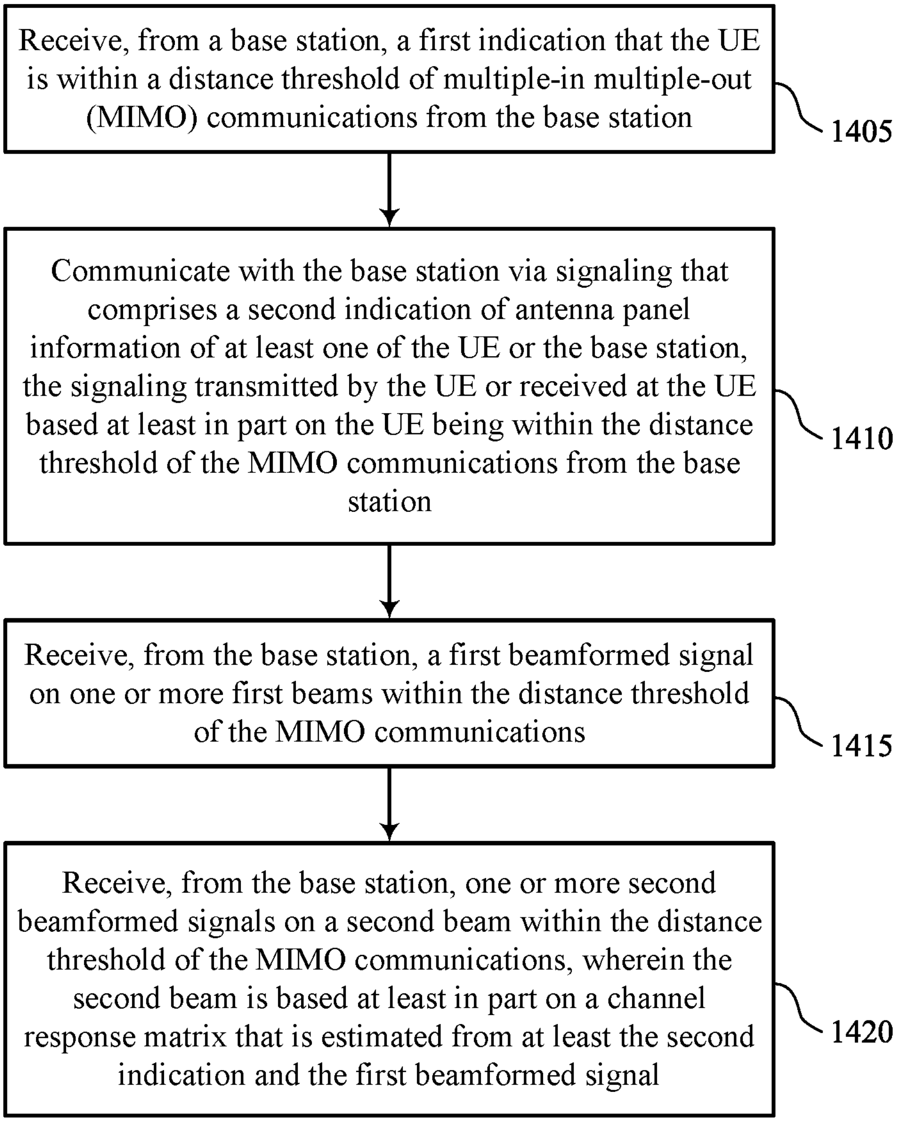
FIGS. 14 through 17 show flowcharts illustrating methods that support channel estimation based beam determination in holographic MIMO systems in accordance with aspects of the present disclosure.

FIG. 14 shows a flowchart illustrating a method 1400 that supports channel estimation based beam determination in holographic MIMO systems in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a first indication that the UE is within a distance threshold of MIMO communications from the base station. The operations of 1405 may be performed in accordance with examples as disclosed herein. In some examples, aspects of the operations of 1405 may be performed by an indication reception component 825 as described with reference to FIG. 8.

At 1410, the method may include communicating with the base station via signaling that includes a second indication of antenna panel information of at least one of the UE or the base station, the signaling transmitted by the UE or received at the UE based on the UE being within the distance threshold of the MIMO communications from the base station. The operations of 1410 may be performed in accordance with examples as disclosed herein. In some examples, aspects of the operations of 1410 may be performed by an antenna panel information component 830 as described with reference to FIG. 8.

At 1415, the method may include receiving, from the base station, a first beamformed signal on one or more first beams within the distance threshold of the MIMO communications. The operations of 1415 may be performed in accordance with examples as disclosed herein. In some examples, aspects of the operations of 1415 may be performed by a beamformed signal reception component 835 as described with reference to FIG. 8.

At 1420, the method may include receiving, from the base station, one or more second beamformed signals on a second beam within the distance threshold of the MIMO communications, where the second beam is based on a channel response matrix that is estimated from at least the second indication and the first beamformed signal. The operations of 1420 may be performed in accordance with examples as disclosed herein. In some examples, aspects of the operations of 1420 may be performed by a channel response matrix component 840 as described with reference to FIG. 8.

Figure 15:
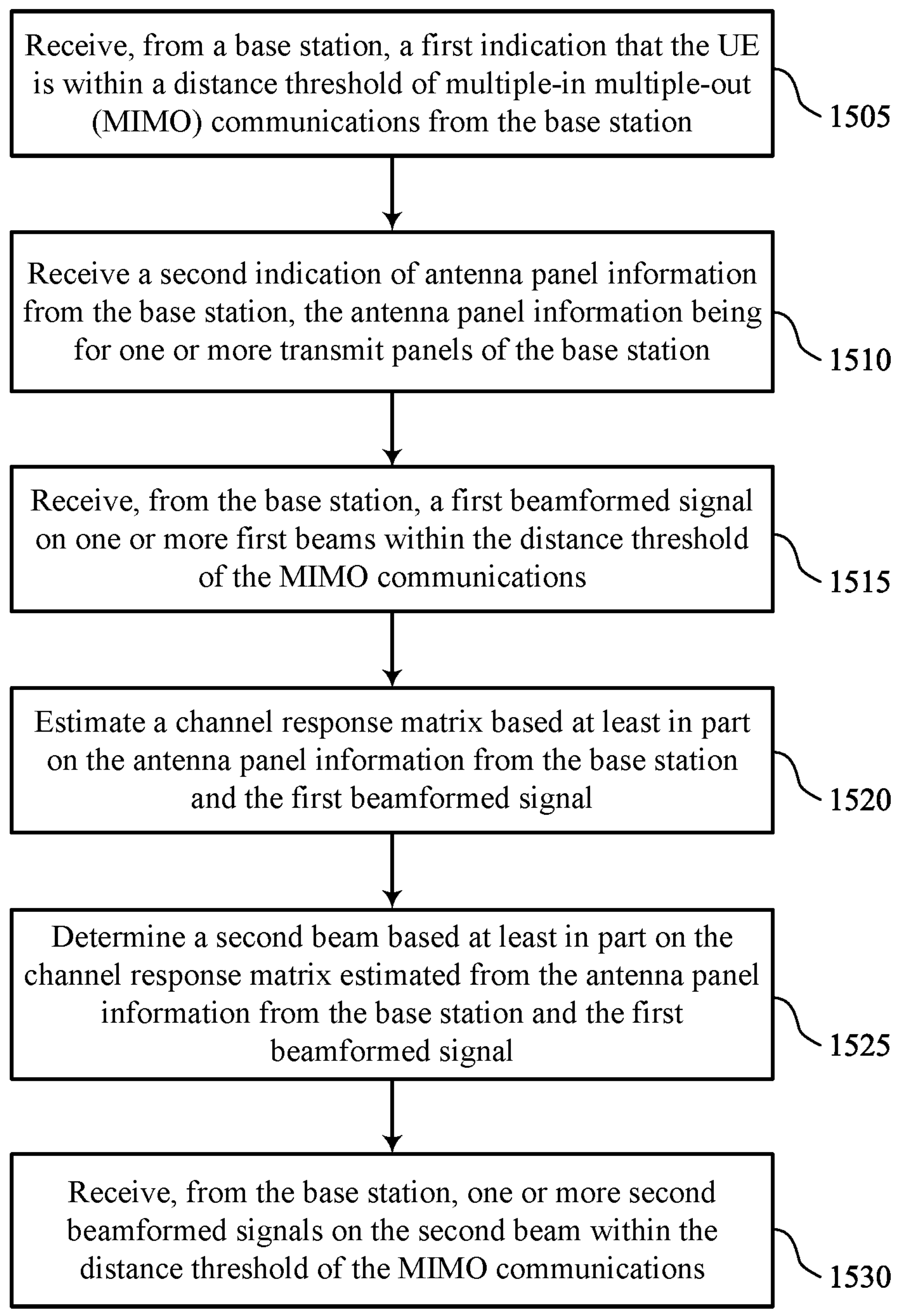

FIG. 15 shows a flowchart illustrating a method 1500 that supports channel estimation based beam determination in holographic MIMO systems in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first indication that the UE is within a distance threshold of MIMO communications from the base station. The operations of 1505 may be performed in accordance with examples as disclosed herein. In some examples, aspects of the operations of 1505 may be performed by an indication reception component 825 as described with reference to FIG. 8.

At 1510, the method may include receiving a second indication of antenna panel information from the base station, the antenna panel information being for one or more transmit panels of the base station. The operations of 1510 may be performed in accordance with examples as disclosed herein. In some examples, aspects of the operations of 1510 may be performed by an antenna panel information component 830 as described with reference to FIG. 8.

At 1515, the method may include receiving, from the base station, a first beamformed signal on one or more first beams within the distance threshold of the MIMO communications. The operations of 1515 may be performed in accordance with examples as disclosed herein. In some examples, aspects of the operations of 1515 may be performed by a beamformed signal reception component 835 as described with reference to FIG. 8.

At 1520, the method may include estimating a channel response matrix based on the antenna panel information from the base station and the first beamformed signal. The operations of 1520 may be performed in accordance with examples as disclosed herein. In some examples, aspects of the operations of 1520 may be performed by a channel response matrix component 840 as described with reference to FIG. 8.

At 1525, the method may include determining a second beam based on the channel response matrix estimated from the antenna panel information from the base station and the first beamformed signal. The operations of 1525 may be performed in accordance with examples as disclosed herein. In some examples, aspects of the operations of 1525 may be performed by a beam determination component 850 as described with reference to FIG. 8.

At 1530, the method may include receiving, from the base station, one or more second beamformed signals on the second beam within the distance threshold of the MIMO communications. The operations of 1530 may be performed in accordance with examples as disclosed herein. In some examples, aspects of the operations of 1530 may be performed by a channel response matrix component 840 as described with reference to FIG. 8.

Figure 16:
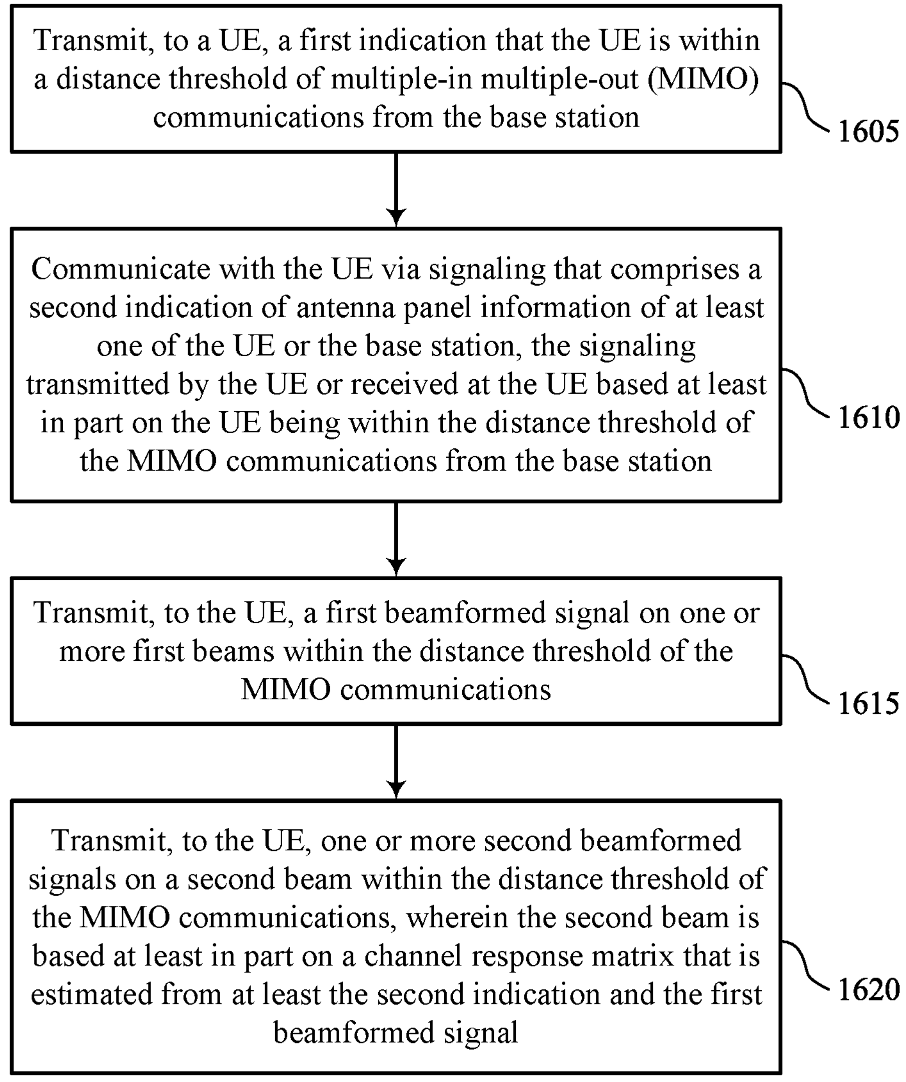

FIG. 16 shows a flowchart illustrating a method 1600 that supports channel estimation based beam determination in holographic MIMO systems in accordance with aspects of the present disclosure. The operations of the method 1600 may be implemented by a base station or its components as described herein. For example, the operations of the method 1600 may be performed by a base station 105 as described with reference to FIGS. 1 through 4 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a first indication that the UE is within a distance threshold of MIMO communications from the base station. The operations of 1605 may be performed in accordance with examples as disclosed herein. In some examples, aspects of the operations of 1605 may be performed by an indication transmission component 1225 as described with reference to FIG. 12.

At 1610, the method may include communicating with the UE via signaling that includes a second indication of antenna panel information of at least one of the UE or the base station, the signaling transmitted by the UE or received at the UE based on the UE being within the distance threshold of the MIMO communications from the base station. The operations of 1610 may be performed in accordance with examples as disclosed herein. In some examples, aspects of the operations of 1610 may be performed by a communication component 1230 as described with reference to FIG. 12.

At 1615, the method may include transmitting, to the UE, a first beamformed signal on one or more first beams within the distance threshold of the MIMO communications. The operations of 1615 may be performed in accordance with examples as disclosed herein. In some examples, aspects of the operations of 1615 may be performed by a beamformed signal transmission component 1235 as described with reference to FIG. 12.

At 1620, the method may include transmitting, to the UE, one or more second beamformed signals on a second beam within the distance threshold of the MIMO communications, where the second beam is based on a channel response matrix that is estimated from at least the second indication and the first beamformed signal. The operations of 1620 may be performed in accordance with examples as disclosed herein. In some examples, aspects of the operations of 1620 may be performed by a channel response matrix estimation component 1240 as described with reference to FIG. 12.

Figure 17:
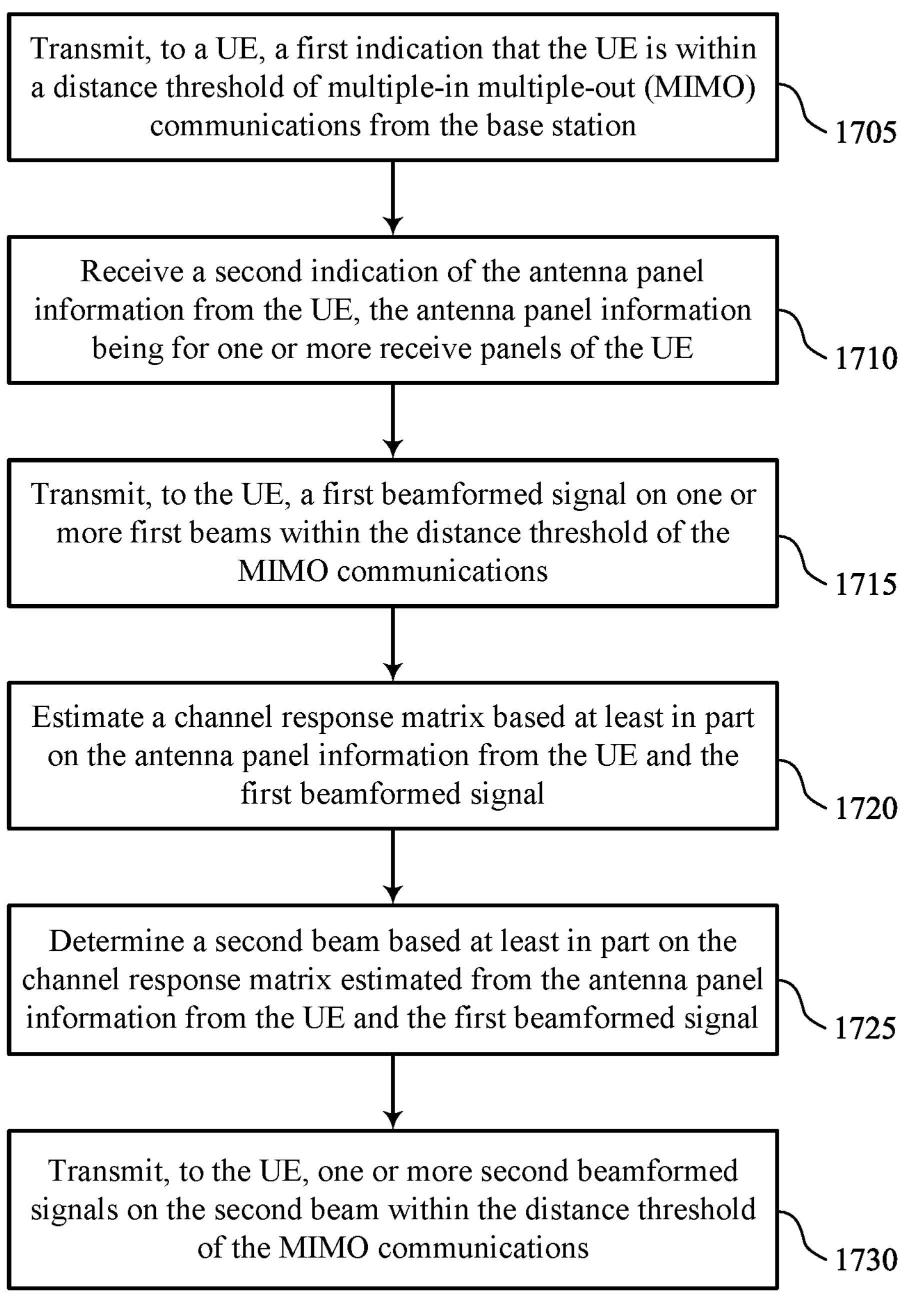

FIG. 17 shows a flowchart illustrating a method 1700 that supports channel estimation based beam determination in holographic MIMO systems in accordance with aspects of the present disclosure. The operations of the method 1700 may be implemented by a base station or its components as described herein. For example, the operations of the method 1700 may be performed by a base station 105 as described with reference to FIGS. 1 through 4 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a first indication that the UE is within a distance threshold of MIMO communications from the base station. The operations of 1705 may be performed in accordance with examples as disclosed herein. In some examples, aspects of the operations of 1705 may be performed by an indication transmission component 1225 as described with reference to FIG. 12.

At 1710, the method may include receiving a second indication of the antenna panel information from the UE, the antenna panel information being for one or more receive panels of the UE. The operations of 1710 may be performed in accordance with examples as disclosed herein. In some examples, aspects of the operations of 1710 may be performed by a communication component 1230 as described with reference to FIG. 12.

At 1715, the method may include transmitting, to the UE, a first beamformed signal on one or more first beams within the distance threshold of the MIMO communications. The operations of 1715 may be performed in accordance with examples as disclosed herein. In some examples, aspects of the operations of 1715 may be performed by a beamformed signal transmission component 1235 as described with reference to FIG. 12.

At 1720, the method may include estimating a channel response matrix based on the antenna panel information from the UE and the first beamformed signal. The operations of 1720 may be performed in accordance with examples as disclosed herein. In some examples, aspects of the operations of 1720 may be performed by a channel response matrix estimation component 1240 as described with reference to FIG. 12.

At 1725, the method may include determining a second beam based on the channel response matrix estimated from the antenna panel information from the UE and the first beamformed signal. The operations of 1725 may be performed in accordance with examples as disclosed herein. In some examples, aspects of the operations of 1725 may be performed by a channel response matrix estimation component 1240 as described with reference to FIG. 12.

At 1730, the method may include transmitting, to the UE, one or more second beamformed signals on the second beam within the distance threshold of the MIMO communications. The operations of 1730 may be performed in accordance with examples as disclosed herein. In some examples, aspects of the operations of 1730 may be performed by a channel response matrix estimation component 1240 as described with reference to FIG. 12.

The following provides an overview of aspects of the present disclosure:

Aspect 1: A method for wireless communication at a UE, comprising: receiving, from a base station, a first indication that the UE is within a distance threshold of MIMO communications from the base station; communicating with the base station via signaling that comprises a second indication of antenna panel information of at least one of the UE or the base station, the signaling transmitted by the UE or received at the UE based at least in part on the UE being within the distance threshold of the MIMO communications from the base station; receiving, from the base station, a first beamformed signal on one or more first beams within the distance threshold of the MIMO communications; and receiving, from the base station, one or more second beamformed signals on a second beam within the distance threshold of the MIMO communications, wherein the second beam is based at least in part on a channel response matrix that is estimated from at least the second indication and the first beamformed signal.

Aspect 2: The method of aspect 1, wherein communicating with the base station via the signaling further comprises: receiving the second indication of the antenna panel information from the base station, the antenna panel information being for one or more transmit panels of the base station.

Aspect 3: The method of aspect 2, further comprising: estimating the channel response matrix based at least in part on the antenna panel information from the base station and the first beamformed signal.

Aspect 4: The method of any of aspects 2 through 3, further comprising: determining the second beam based at least in part on the channel response matrix estimated from the antenna panel information from the base station and the first beamformed signal.

Aspect 5: The method of any of aspects 2 through 4, further comprising: transmitting, to the base station, a report indicating the channel response matrix estimated by the UE based at least in part on the antenna panel information from the base station and the first beamformed signal.

Aspect 6: The method of any of aspects 2 through 5, further comprising: transmitting, to the base station, a report indicating the second beam to be used for the one or more second beamformed signals, the second beam determined based at least in part on the channel response matrix estimated from the antenna panel information from the base station and the first beamformed signal.

Aspect 7: The method of any of aspects 1 through 6, wherein communicating with the base station via the signaling further comprises: transmitting the second indication of the antenna panel information from the UE to the base station, the antenna panel information being for one or more receive panels of the UE.

Aspect 8: The method of any of aspects 1 through 7, wherein receiving the first indication that the UE is within the distance threshold of the MIMO communications from the base station further comprises: receiving the first indication in a system information message or via a unicast or multicast message.

Aspect 9: The method of any of aspects 1 through 8, further comprising: receiving the first indication that the UE is within the distance threshold of MIMO communications from the base station is an alternative to receiving notice that the UE is outside of the distance threshold of the MIMO communications from the base station.

Aspect 10: The method of any of aspects 1 through 9, wherein receiving the first beamformed signal on the one or more first beams within the distance threshold of the MIMO communications comprises: receiving the first beamformed signal as a beamformed data signal or a reference signal.

Aspect 11: The method of any of aspects 1 through 10, wherein receiving the first beamformed signal on the one or more first beams within the distance threshold of the MIMO communications comprises: taking measurements of the first beamformed signal on the one or more first beams, wherein a number of beams on which the measurements are taken is greater than a number of reflectors between the UE and the base station, and wherein the one or more first beams are beams directed towards the UE, randomly-directed beams, or both.

Aspect 12: The method of any of aspects 1 through 11, wherein the antenna panel information is for either one or more transmit panels of the base station or one or more receive panels of the UE, and wherein the antenna panel information comprises a panel length, a number of antennas per panel, positions of the antennas per panel, or a combination thereof.

Aspect 13: The method of any of aspects 1 through 12, wherein communicating with the base station via the signaling further comprises: communicating the second indication of the antenna panel information during a connection setup procedure between the base station and the UE or after a change in either a transmit panel of the base station or a receive panel of the UE.

Aspect 14: The method of any of aspects 1 through 13, wherein communicating with the base station via the signaling further comprises: communicating, with the antenna panel information, beamforming weight information indicative of beamforming weights used either by the base station to transmit the first beamformed signal or by the UE to receive the first beamformed signal.

Aspect 15: The method of aspect 14, wherein the beamforming weight information includes one or more indices of codewords that represent the beamforming weights, and wherein each of the beamforming weights is associated with one of the one or more first beams.

Aspect 16: A method for wireless communication at a base station, comprising: transmitting, to a UE, a first indication that the UE is within a distance threshold of MIMO communications from the base station; communicating with the UE via signaling that comprises a second indication of antenna panel information of at least one of the UE or the base station, the signaling transmitted by the UE or received at the UE based at least in part on the UE being within the distance threshold of the MIMO communications from the base station; transmitting, to the UE, a first beamformed signal on one or more first beams within the distance threshold of the MIMO communications; and transmitting, to the UE, one or more second beamformed signals on a second beam within the distance threshold of the MIMO communications, wherein the second beam is based at least in part on a channel response matrix that is estimated from at least the second indication and the first beamformed signal.

Aspect 17: The method of aspect 16, wherein communicating with the UE via the signaling further comprises: receiving the second indication of the antenna panel information from the UE, the antenna panel information being for one or more receive panels of the UE.

Aspect 18: The method of aspect 17, further comprising: estimating the channel response matrix based at least in part on the antenna panel information from the UE and the first beamformed signal.

Aspect 19: The method of any of aspects 17 through 18, further comprising: determining the second beam based at least in part on the channel response matrix estimated from the antenna panel information from the UE and the first beamformed signal.

Aspect 20: The method of any of aspects 17 through 19, further comprising: receiving, from the UE, a report indicating the channel response matrix estimated by the UE based at least in part on the antenna panel information from the base station and the first beamformed signal.

Aspect 21: The method of any of aspects 17 through 20, further comprising: receiving, from the UE, a report indicating the second beam to be used for the one or more second beamformed signals, the second beam determined based at least in part on the channel response matrix estimated from the antenna panel information from the base station and the first beamformed signal.

Aspect 22: The method of any of aspects 16 through 21, wherein communicating with the base station via the signaling further comprises: transmitting the second indication of the antenna panel information from the base station to the UE, the antenna panel information being for one or more transmit panels of the base station.

Aspect 23: The method of any of aspects 16 through 22, wherein transmitting the first indication that the UE is within the distance threshold of the MIMO communications from the base station further comprises: transmitting the first indication in a system information message or via a unicast or multicast message.

Aspect 24: The method of any of aspects 16 through 23, wherein transmitting the first indication that the UE is within the distance threshold of MIMO communications from the base station is an alternative to transmitting notice that the UE is outside of the distance threshold of the MIMO communications from the base station.

Aspect 25: The method of any of aspects 16 through 24, wherein transmitting the first beamformed signal on the one or more first beams within the distance threshold of the MIMO communications comprises: transmitting the first beamformed signal as a beamformed data signal or a reference signal.

Aspect 26: The method of any of aspects 16 through 25, wherein the antenna panel information is for either one or more transmit panels of the base station or one or more receive panels of the UE, and wherein the antenna panel information comprises a panel length, a number of antennas per panel, positions of the antennas per panel, or a combination thereof.

Aspect 27: The method of any of aspects 16 through 26, wherein communicating with the UE via the signaling further comprises: communicating the second indication of the antenna panel information during a connection setup procedure between the base station and the UE or after a change in either a transmit panel of the base station or a receive panel of the UE.

Aspect 28: The method of any of aspects 16 through 27, wherein communicating with the UE via the signaling further comprises: communicating, with the antenna panel information, beamforming weight information indicative of beamforming weights used either by the base station to transmit the first beamformed signal or by the UE to receive the first beamformed signal.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a base station, a first indication that the UE is within a distance threshold of multiple-in multiple-out (MIMO) communications from the base station;

communicating with the base station via signaling that comprises a second indication of antenna panel information of at least one of the UE or the base station, the signaling transmitted by the UE or received at the UE based at least in part on the UE being within the distance threshold of the MIMO communications from the base station;

receiving, from the base station, a first beamformed signal on one or more first beams within the distance threshold of the MIMO communications; and receiving, from the base station, one or more second beamformed signals on a second beam within the distance threshold of the MIMO communications, wherein the second beam is based at least in part on a channel response matrix that is estimated from at least the second indication and the first beamformed signal.

2. The method of claim 1, wherein communicating with the base station via the signaling further comprises:

receiving the second indication of the antenna panel information from the base station, the antenna panel information being for one or more transmit panels of the base station.

3. The method of claim 2, further comprising: estimating the channel response matrix based at least in part on the antenna panel information from the base station and the first beamformed signal.

4. The method of claim 2, further comprising: determining the second beam based at least in part on the channel response matrix estimated from the antenna panel information from the base station and the first beamformed signal.

5. The method of claim 2, further comprising: transmitting, to the base station, a report indicating the channel response matrix estimated by the UE based at least in part on the antenna panel information from the base station and the first beamformed signal.

6. The method of claim 2, further comprising: transmitting, to the base station, a report indicating the second beam to be used for the one or more second beamformed signals, the second beam determined based at least in part on the channel response matrix estimated from the antenna panel information from the base station and the first beamformed signal.

7. The method of claim 1, wherein communicating with the base station via the signaling further comprises:

transmitting the second indication of the antenna panel information from the UE to the base station, the antenna panel information being for one or more receive panels of the UE.

8. The method of claim 1, wherein receiving the first indication that the UE is within the distance threshold of the MIMO communications from the base station further comprises:

receiving the first indication in a system information message or via a unicast or multicast message.

9. The method of claim 1, further comprising: receiving a third indication that the UE is outside of the distance threshold of the MIMO communications from the base station.

10. The method of claim 1, wherein receiving the first beamformed signal on the one or more first beams within the distance threshold of the MIMO communications comprises:

receiving the first beamformed signal as a beamformed data signal or a reference signal.

11. The method of claim 1, wherein receiving the first beamformed signal on the one or more first beams within the distance threshold of the MIMO communications comprises:

taking measurements of the first beamformed signal on the one or more first beams, wherein a number of beams on which the measurements are taken is greater than a number of reflectors between the UE and the base station, and wherein the one or more first beams are beams directed towards the UE, randomly-directed beams, or both.

12. The method of claim 1, wherein the antenna panel information is for either one or more transmit panels of the base station or one or more receive panels of the UE, and wherein the antenna panel information comprises a panel length, a number of antennas per panel, positions of the antennas per panel, or a combination thereof.

13. The method of claim 1, wherein communicating with the base station via the signaling further comprises:

communicating the second indication of the antenna panel information during a connection setup procedure between the base station and the UE or after a change in either a transmit panel of the base station or a receive panel of the UE.

14. The method of claim 1, wherein communicating with the base station via the signaling further comprises:

communicating, with the antenna panel information, beamforming weight information indicative of beamforming weights used either by the base station to transmit the first beamformed signal or by the UE to receive the first beamformed signal.

15. The method of claim 14, wherein the beamforming weight information includes one or more indices of codewords that represent the beamforming weights, and wherein each of the beamforming weights is associated with one of the one or more first beams.

16. A method for wireless communication at a base station, comprising:

transmitting, to a user equipment (UE), a first indication that the UE is within a distance threshold of multiple-in multiple-out (MIMO) communications from the base station;

communicating with the UE via signaling that comprises a second indication of antenna panel information of at least one of the UE or the base station, the signaling transmitted by the UE or received at the UE based at least in part on the UE being within the distance threshold of the MIMO communications from the base station;

transmitting, to the UE, a first beamformed signal on one or more first beams within the distance threshold of the MIMO communications; and transmitting, to the UE, one or more second beamformed signals on a second beam within the distance threshold of the MIMO communications, wherein the second beam is based at least in part on a channel response matrix that is estimated from at least the second indication and the first beamformed signal.

17. The method of claim 16, wherein communicating with the UE via the signaling further comprises:

receiving the second indication of the antenna panel information from the UE, the antenna panel information being for one or more receive panels of the UE.

18. The method of claim 17, further comprising: estimating the channel response matrix based at least in part on the antenna panel information from the UE and the first beamformed signal.

19. The method of claim 17, further comprising: determining the second beam based at least in part on the channel response matrix estimated from the antenna panel information from the UE and the first beamformed signal.

20. The method of claim 17, further comprising: receiving, from the UE, a report indicating the channel response matrix estimated by the UE based at least in part on the antenna panel information from the base station and the first beamformed signal.

21. The method of claim 17, further comprising: receiving, from the UE, a report indicating the second beam to be used for the one or more second beamformed signals, the second beam determined based at least in part on the channel response matrix estimated from the antenna panel information from the base station and the first beamformed signal.

22. The method of claim 16, wherein communicating with the base station via the signaling further comprises:

transmitting the second indication of the antenna panel information from the base station to the UE, the antenna panel information being for one or more transmit panels of the base station.

23. The method of claim 16, wherein transmitting the first indication that the UE is within the distance threshold of the MIMO communications from the base station further comprises:

transmitting the first indication in a system information message or via a unicast or multicast message.

24. The method of claim 16, further comprising:

transmitting a third indication that the UE is outside of the distance threshold of the MIMO communications from the base station.

25. The method of claim 16, wherein transmitting the first beamformed signal on the one or more first beams within the distance threshold of the MIMO communications comprises:

transmitting the first beamformed signal as a beamformed data signal or a reference signal.

26. The method of claim 16, wherein the antenna panel information is for either one or more transmit panels of the base station or one or more receive panels of the UE, and wherein the antenna panel information comprises a panel length, a number of antennas per panel, positions of the antennas per panel, or a combination thereof.

27. The method of claim 16, wherein communicating with the UE via the signaling further comprises:

communicating the second indication of the antenna panel information during a connection setup procedure between the base station and the UE or after a change in either a transmit panel of the base station or a receive panel of the UE.

28. The method of claim 16, wherein communicating with the UE via the signaling further comprises:

communicating, with the antenna panel information, beamforming weight information indicative of beamforming weights used either by the base station to transmit the first beamformed signal or by the UE to receive the first beamformed signal.

29. An apparatus for wireless communication at a user equipment (UE), comprising:

a processor;

memory coupled with the processor; and instructions stored in the memory and executable by the processor to cause the apparatus to:

receive, from a base station, a first indication that the UE is within a distance threshold of multiple-in multiple-out (MIMO) communications from the base station;

communicate with the base station via signaling that comprises a second indication of antenna panel information of at least one of the UE or the base station, the signaling transmitted by the UE or received at the UE based at least in part on the UE being within the distance threshold of the MIMO communications from the base station;

receive, from the base station, a first beamformed signal on one or more first beams within the distance threshold of the MIMO communications; and receive, from the base station, one or more second beamformed signals on a second beam within the distance threshold of the MIMO communications, wherein the second beam is based at least in part on a channel response matrix that is estimated from at least the second indication and the first beamformed signal.

30. An apparatus for wireless communication at a base station, comprising:

a processor;

memory coupled with the processor; and instructions stored in the memory and executable by the processor to cause the apparatus to:

transmit, to a user equipment (UE), a first indication that the UE is within a distance threshold of multiple-in multiple-out (MIMO) communications from the base station;

communicate with the UE via signaling that comprises a second indication of antenna panel information of at least one of the UE or the base station, the signaling transmitted by the UE or received at the UE based at least in part on the UE being within the distance threshold of the MIMO communications from the base station;

transmit, to the UE, a first beamformed signal on one or more first beams within the distance threshold of the MIMO communications; and transmit, to the UE, one or more second beamformed signals on a second beam within the distance threshold of the MIMO communications, wherein the second beam is based at least in part on a channel response matrix that is estimated from at least the second indication and the first beamformed signal.

* * * * *